US011314551B2

(12) United States Patent
Ballantyne et al.

(10) Patent No.: US 11,314,551 B2
(45) Date of Patent: Apr. 26, 2022

(54) RESOURCE ALLOCATION AND SCHEDULING FOR BATCH JOBS

(71) Applicant: Amazon Technologies, Inc., Seattle, WA (US)

(72) Inventors: Dougal Stuart Ballantyne, Seattle, WA (US); James Edward Kinney, Jr., Seattle, WA (US); Aswin Damodar, Seattle, WA (US); Chetan Hosmani, Seattle, WA (US); Rejith George Joseph, Seattle, WA (US); Chris William Ramsey, Seattle, WA (US); Kiuk Chung, Seattle, WA (US); Jason Roy Rupard, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/818,297

(22) Filed: Mar. 13, 2020

(65) Prior Publication Data

US 2020/0218569 A1    Jul. 9, 2020

Related U.S. Application Data

(63) Continuation of application No. 15/360,948, filed on Nov. 23, 2016, now Pat. No. 10,592,280.

(51) Int. Cl.
*G06F 9/48* (2006.01)
*G06F 9/50* (2006.01)

(52) U.S. Cl.
CPC .......... *G06F 9/4881* (2013.01); *G06F 9/5016* (2013.01); *G06F 9/5027* (2013.01); *G06F 9/5072* (2013.01)

(58) Field of Classification Search
CPC .... G06F 9/4881; G06F 9/5016; G06F 9/5027; G06F 9/5072
USPC .................................................. 718/101–108
See application file for complete search history.

(56) References Cited

U.S. PATENT DOCUMENTS

| 4,633,387 A | | 12/1986 | Hartung et al. | |
|---|---|---|---|---|
| 4,800,521 A | * | 1/1989 | Carter | G06F 9/5055 712/211 |
| 4,807,111 A | * | 2/1989 | Cohen | G06F 9/4881 710/54 |
| 5,303,369 A | * | 4/1994 | Borcherding | G06F 9/4887 712/244 |

(Continued)

FOREIGN PATENT DOCUMENTS

WO    2012058003    5/2012

OTHER PUBLICATIONS

El-Rewini et al, T" ask Scheduling Multiprocessing Systems", ACM, pp. 27-37 (Year: 1995).*

(Continued)

*Primary Examiner* — Anil Khatri
(74) *Attorney, Agent, or Firm* — Robert C. Kowert; Kowert, Hood, Munyon, Rankin & Goetzel, P.C.

(57) ABSTRACT

A scheduler of a batch job management service determines that a set of resources a client is insufficient to execute one or more jobs. The scheduler prepares a multi-dimensional statistical representation of resource requirements of the jobs, and transmits it to a resource controller. The resource controller uses the multi-dimensional representation and resource usage state information to make resource allocation change decisions.

20 Claims, 11 Drawing Sheets

(56) References Cited

U.S. PATENT DOCUMENTS

| | | | |
|---|---|---|---|
| 5,437,032 A * | 7/1995 | Wolf | G06F 9/4881 718/103 |
| 6,263,358 B1 * | 7/2001 | Lee | G06F 8/458 718/100 |
| 6,341,303 B1 * | 1/2002 | Rhee | G06F 9/4881 710/240 |
| 6,345,287 B1 * | 2/2002 | Fong | G06F 8/451 718/102 |
| 6,715,145 B1 | 3/2004 | Bowman-Amuah | |
| 6,757,897 B1 * | 6/2004 | Shi | G06F 9/4843 710/240 |
| 7,093,004 B2 | 8/2006 | Bernardin et al. | |
| 7,117,184 B1 | 10/2006 | Fontana et al. | |
| 7,127,716 B2 | 10/2006 | Jin et al. | |
| 7,137,119 B1 * | 11/2006 | Sankaranarayan | G06F 9/5011 718/103 |
| 7,167,915 B2 | 1/2007 | Bendich et al. | |
| 7,251,815 B2 * | 7/2007 | Donovan | G06F 9/485 718/1 |
| 7,356,770 B1 | 4/2008 | Jackson | |
| 7,433,931 B2 * | 10/2008 | Richoux | G06F 9/5027 709/217 |
| 7,454,754 B2 | 11/2008 | Tajima | |
| 7,590,983 B2 | 9/2009 | Neiman et al. | |
| 7,614,053 B2 * | 11/2009 | Inoue | G06F 9/4881 718/1 |
| 7,640,547 B2 | 12/2009 | Neiman et al. | |
| 7,930,398 B2 | 4/2011 | Kawato | |
| 7,979,859 B2 | 7/2011 | Li et al. | |
| 7,996,839 B2 | 8/2011 | Farkas et al. | |
| 8,028,285 B2 | 9/2011 | Ly et al. | |
| 8,230,426 B2 | 7/2012 | Powers et al. | |
| 8,245,237 B2 | 8/2012 | Tajima | |
| 8,347,302 B1 * | 1/2013 | Vincent | G06F 9/5011 718/104 |
| 8,417,555 B2 * | 4/2013 | Bagheri | G06Q 10/06 705/7.22 |
| 8,417,715 B1 | 4/2013 | Bruckhaus et al. | |
| 8,418,186 B2 | 4/2013 | Jackson | |
| 8,555,281 B1 | 10/2013 | van Dijk et al. | |
| 8,566,830 B2 * | 10/2013 | Ringseth | G06F 9/4881 718/102 |
| 8,612,980 B2 | 12/2013 | Martin et al. | |
| 8,689,229 B2 | 4/2014 | Tajima | |
| 8,738,860 B1 * | 5/2014 | Griffin | G06F 13/4022 711/122 |
| 8,782,246 B2 | 7/2014 | Jackson | |
| 8,924,964 B2 | 12/2014 | Kodi et al. | |
| 8,997,107 B2 | 3/2015 | Jain | |
| 9,026,662 B2 | 5/2015 | Zhu et al. | |
| 9,116,731 B2 | 8/2015 | Tung et al. | |
| 9,172,628 B2 | 10/2015 | Barsness et al. | |
| 9,215,190 B2 | 12/2015 | Tung et al. | |
| 9,239,996 B2 | 1/2016 | Moorthi et al. | |
| 9,413,707 B2 * | 8/2016 | Roman | H04W 4/14 |
| 9,442,760 B2 * | 9/2016 | Boutin | G06F 9/505 |
| 10,592,280 B2 | 3/2020 | Ballantyne et al. | |
| 10,761,796 B1 * | 9/2020 | Yokoohji | G06F 3/126 |
| 10,789,099 B1 * | 9/2020 | Sandstrom | G06F 9/546 |
| 11,055,135 B2 * | 7/2021 | Popovic | H04L 41/0896 |
| 2007/0234363 A1 | 10/2007 | Ferrandiz | |
| 2010/0139887 A1 | 6/2010 | Slessman | |
| 2012/0246661 A1 | 9/2012 | Nishimura | |
| 2012/0300391 A1 | 11/2012 | Keisling et al. | |
| 2013/0023594 A1 | 1/2013 | Van Hardeveld et al. | |
| 2014/0297855 A1 | 10/2014 | Moore et al. | |
| 2015/0136939 A1 | 5/2015 | Haselden | |
| 2015/0143380 A1 | 5/2015 | Chen et al. | |
| 2015/0220370 A1 | 8/2015 | Ujibashi | |
| 2015/0379423 A1 | 12/2015 | Dirac et al. | |

OTHER PUBLICATIONS

Selvarani et al, "Improved Cost-Based Algorithm for Task Scheduling in Cloud Computing", IEEE, pp. 1-5 (Year: 2010).*
Ilavarasan et al, "Performance Effective Task Scheduling Algorithm for Heterogeneous Computing System", IEEE, pp. 1-8 (Year: 2005).*
Chen et al, "Efficient Program Scheduling for Heterogeneous Multi-core Processors", ACM, pp. 927-930 (Year: 2009).*
Yang et al, "A Comprehensive Task Scheduling Algorithm in Grid", IEEE, pp. 3-10 (Year: 2010).*
Tiwari et al ,"Classification Framework of MapReduce Scheduling Algorithms", ACM pp. 1-38 (Year: 2015).*
Yin et al, "An Industrial Dynamic Skyline Based Similarity Joins For Multidimensional Big Data Applications", IEEE, pp. 2520-2532 (Year: 2020).*
Heimel et al, "Self-Tuning, GPU-Accelerated Kernel Density Models for Multidimensional Selectivity Estimation", ACM, pp. 1472-1492 (Year: 2015).*
Dougal Ballantyne, "cfncluster 0.0.22", Retrieved from URL: https://pypi.python.org/pypi/cfncluster/0.0.22 on Aug. 4, 2015, p. 1.
"IBM Platform Computing Solutions", International Technical Support Organization, Retrieved from URL: http://www.redbooks.ibm.com/abstracts/sg248081.html?Open, Mar. 2013, pp. 1-142.
"Quick Start User Guide", Slurm Version 16.05, Mar. 2016, Retrieved from URL: http://slurm.schedmd.com/quickstart.html. pp. 1-7.
Chris Dagdigian, "Which Grid Engine?", Bio-IT World, Feb. 2012, Retrieved from URL: http://www.bio-itworld.com/2012/02/15/which-grid-engine.html. pp. 1-3.
"Dell Launches Enterprise Class Fully Mobile Data Center Solution to Power Mobile Government and Military Operations", Dell, Jul. 17, 2012, pp. 1-2.
U.S. Appl. No. 15/188,865, filed Jun. 21, 2016, James Edward Kinney et al.
U.S. Appl. No. 15/195,893, filed Jun. 28, 2016, James Edward Kinney et al.
U.S. Appl. No. 15/195,890, filed Jun. 28, 2016, James Edward Kinney et al.
U.S. Appl. No. 15/197,636, filed Jun. 29, 2016, Peter George Ross et al.
International Search Report and Written Opinion from PCT/US2017/062353, dated Feb. 20, 2018, Amazon Technologies, Inc., pp. 1-13.
Bar-Noy et al., "Throughput Maximization of Real-Time Scheduling with Batching", ACM Transactions on Algorithms, vol. 5, No. 2, Article 18, 2009, pp. 1-17.
Lawson et al., "Multiple-queue Backfilling Scheduling with Priorities and Reservations for Parallel Systems", ACM, 2002, pp. 40-47.
Eom et al., "Collaborative Multi-dimensional Dataset Processing with Distributed Cache Infrastructure in the Cloud", IEEE, 2014. pp. 241-248.
Ganapathy et al., "Statistics-Driven Workload Modeling for the Cloud", IEEE, 2010, pp. 87-92.
Raz et al., "Fairness Considerations of Scheduling in Multi-Server and Multi-Queue Systems", ACM, 2006, pp. 1-12.
Sheikhalishahi et al, "A multi-dimensional job scheduling", Future Generation Computer sSystem.
Jones, "Using Checkpointing to Recover from Poor Multi-site Parallel Job Scheduling Decisions", ACM, 2007, pp. 1-6.
Office Action dated Dec. 16, 2021 in European Patent Application No. 17811782.6, Amazon Technologies, Inc., pp. 1-11.
Vasile, Mihaela-Andreea, et al., "HySARC2: Hybrid Scheduling Algorithm Based on Resource Clustering in Cloud Environments," International Conference on Algorithms and Architectures for Parallel Processing, ICA3PP 2013, Part 1, Lecture Notes in Computer Science (LNCS), pp. 416-425, Springer, Berlin.

* cited by examiner

RESOURCE ALLOCATION AND SCHEDULING FOR BATCH JOBS

This application is a continuation of U.S. patent application Ser. No. 15/360,948, filed Nov. 23, 2016, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. Such resources at data centers, when accessed by remote customers, may be said to reside "in the cloud" and may be referred to as cloud computing resources.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner.

The use of virtualization with cloud computing resources to run client programs may enable some clients to access a much greater amount of computing capacity at a given time than would be possible with the clients' on-premises resources. Some clients, for example, may wish to execute large sets of analytics and other compute-intensive computations that could easily exhaust the resource capacities of on-premises resources. Some such computations may have dependencies with respect to others, and the combinations of resources needed may vary for different computations. Managing the allocation of cloud resources efficiently for varying computational workloads may present a non-trivial problem.

Figure 1:
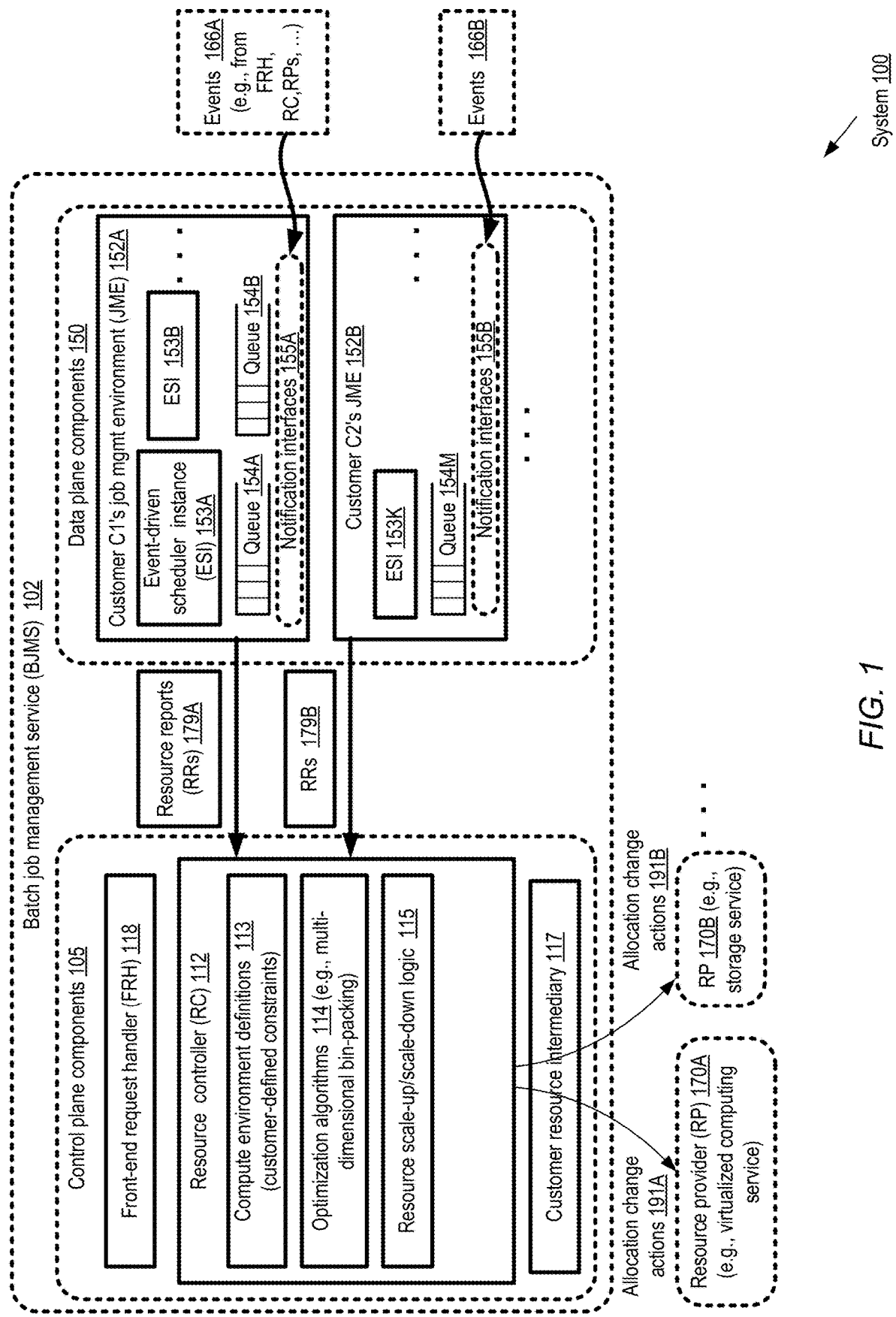
FIG. 1 illustrates an example system environment in which a resource controller may fulfill multi-dimensional resource requirements identified by event-driven schedulers for batch job processing, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for managing the allocation of resources to be used to fulfill job requests submitted by clients of a batch job management service are described. In at least some embodiments, a network-accessible batch job management service may be implemented at a provider network. Networks set up by an entity such as a company or a public sector organization to provide one or more network-accessible services (such as various types of cloud-based computing or storage services) accessible via the Internet and/or other networks to a distributed set of clients may be termed provider networks in such embodiments. A provider network may sometimes be referred to as a "public cloud" environment. The resources of a provider network may in some cases be distributed across multiple data centers, which in turn may be distributed among numerous cities, states and countries.

In one embodiment, a batch job management service may implement one or more programmatic interfaces enabling clients to specify constraints on the number and types of resources that can be deployed which are to be used for the clients' batch jobs. Respective sets of such constraints may be specified for one or more logical groupings of resources, each of which may be termed a compute environment, by a given client. Queues to be used for managing the scheduling of jobs, as well as job definitions and mappings between queues and the compute environments may also be indicated using the programmatic interfaces in one embodiment. One or more scheduler instances (e.g., each comprising a respective thread or process) may be instantiated for the jobs of one or more queues of a client in one embodiment. The schedulers may be considered part of the data plane of the service (the portion of the service which handles/processes client application data including, for example, submitted jobs), as opposed to the control plane which represents the administrative portion of the service. The client may submit jobs to any of the client's queues, with each submitted job indicating various attributes of the resources needed for implementing the job, such as the number of CPUs of a particular type, the amount of memory, and so on. In some embodiments, dependencies among the jobs may also be indicated in the job submissions. The schedulers set up for the client may, at various points in time and under various triggering conditions, examine the pending jobs in a given queue, and at least in some cases generate a multi-dimensional statistical representation of the requirements of the pending jobs of the queue in some embodiments. For example, the statistical distribution of the jobs' CPU requirements may represent one dimension, while the statistical distribution of the jobs' memory requirements may represent another dimension. In various embodiments, the term "pending job" may be used to refer to a submitted job that has not yet been completed, e.g., either because it has not yet begun execution or because it has begun execution but has not yet completed execution.

In some embodiments, the statistical representation may be provided by a scheduler as part of a resource report to a control plane or administrative component of the service, called the resource controller. The technique used for generating the multi-dimensional representations may be independent of the current populations of the job queues in one embodiment. Regardless of whether a queue has ten pending jobs or a hundred thousand pending jobs, the size of the multi-dimensional representation of the job requirements, and hence the size of the resource report, may remain fairly small in various embodiments, e.g., limited to a few kilobytes or a few tens of kilobytes in some implementations. The techniques to limit the size of the resource report, described below in further detail, may enable the service to handle arbitrarily large (or small) queue sizes without impacting performance of the resource allocation decision making process in various embodiments.

In response to receiving a resource report, the resource controller may be responsible for determining whether, in view of the resource constraints specified by the client, the multi-dimensional representation of job resource requirements, and/or state information pertaining to the current allocation and usage of resources, any additional resources are to be allocated to allow one or more of the pending jobs to be performed. If new resources are to be allocated, and/or if other changes such as consolidation or splitting of existing resources are to be made, the appropriate requests may be transmitted on behalf of the resource controller to one or more resource providers (which may, for example, include other network-accessible services of the provider network). The responsibilities for making resource allocation changes may thus be separated from the actual scheduling of the jobs in such embodiments, with resource allocation change decisions being made in the control plane, while job scheduling is performed in the data plane. Such a division of responsibilities may simplify the implementation of the schedulers in some embodiments. In one embodiment, for example, the schedulers may implement an event-driven execution model, in which a given scheduler reacts to event notifications from various sources and does not necessarily have to poll other components of the system. The multi-dimensional aspect of the requirements included in the report may enable precise needs-driven allocation decisions to be made in various embodiments. Generally speaking, the more details the resource controller has regarding job requirements, the better the fit that may be identified between jobs and resources in various embodiments, thereby potentially reducing over-allocation and under-allocation of resources.

Example System Environment

FIG. 1 illustrates an example system environment in which a resource controller may fulfill multi-dimensional resource requirements identified by event-driven schedulers for batch job processing, according to at least some embodiments. As shown, a batch job management service 102 may comprise a set of control plane components 105 and a set of data plane components 150. The control plane or administrative components may include, for example, a front-end request handler (FRH) 118, a resource controller 112, and a customer resource intermediary 117 in the depicted embodiment. As suggested by the names, the front-end request handler 118 may be responsible for receiving requests submitted by clients of the service 102, and initiating the actions needed to respond to the requests. A variety of programmatic requests may be submitted by clients to the FRH, such as requests to create queues, create/modify compute environments, submit jobs, terminate jobs, etc. The resource controller may make allocation change decisions with respect to various resources accessible from a variety of resource providers 170 (e.g., 170A or 170B)—e.g., to allocate additional resources, consolidate or split allocated resources, or free allocated resources, depending on client needs. The customer resource intermediary may receive requests for the resource allocation change actions 191 (e.g., actions 191A or 191B) from the resource controller 112, and transmit them to the resource providers using the appropriate client authorization credentials in the depicted embodiment.

The data plane components may comprise respective job management environments (JMEs) 152 for various clients or customers of the batch job management service 102. For example, customer C1's JME 152A may include job queues 154A and 154B, as well as event-driven scheduler instances (ESIs) 153A and 153B, while customer C2's JME 152B may comprise queue 154M and ESI 153K. In some embodiments, job queues may be established in response to programmatic requests submitted to the front-end request handler 118 by clients, while the ESIs may be set up by the resource controller based, for example on the number of job queues and/or the expected rate of job submissions. In one embodiment, for example, more ESIs may be established by the resource controller as the number of jobs pending increases, or more computational or memory resources may be added to existing ESIs. In another embodiment, ESIs may be created in response to client requests instead of or in addition to being managed by the resource controller.

The ESIs 153 may receive event notifications 166 (e.g., 166A and 166B) from a number of different types of sources in the depicted embodiment via respective notification interfaces 155, such as 155A or 155B. Some event notifications may be generated by the front-end request handlers 118, e.g., when new jobs are submitted by clients, when existing jobs are canceled/terminated by client requests, and so on. Other event notifications may be generated when running jobs complete at the resource providers in various embodiments. In addition, in at least one embodiment information regarding the current usage of various resources may be reported to the ESIs in the form of event notifications. In response to receiving at least some types of event notifications, an ESI 153 may analyze the current state of the job queues 154 for which it is responsible. A resource report 179 (e.g., resource report 179A or 179B) may be prepared and transmitted to the resource controller, e.g., based on the state of the queue(s) and the resources which are already available to the scheduler for jobs. As discussed below in further detail, the resource report 179 may comprise one or more of the following elements in the depicted embodiment: a multi-dimensional statistical representation of the requirements of a selected set of queued jobs, and resource usage status information for one or more compute environments configured for the client. The multi-dimensional representation may indicate the distribution of values along several different attributes or dimensions of job requirements of a given queue—e.g. the distribution of processing (virtual or physical CPU) requirements, the distribution of memory requirements, deadlines for starting or ending jobs, and so on. In some embodiments, one such multi-dimensional representation may be generated per queue in the client's JME, while in other embodiments a single multi-dimensional representation may be generated for more than one queue.

The resource controller 112 may have access to customers' compute environment definitions 113, which may indicate constraints on the maximum (or minimum) set of resources that are to be allocated on behalf of a given client such as C1 or C2. Using one or more optimization algorithms 114 such as various types of bin-packing algorithms the resource controller's scale-up/scale-down logic 115 may determine whether the set of resources currently allocated to a client is to be scaled up (by allocating/activating new resources without violating the constraints in the compute environment definitions 113) or scaled down (e.g., by de-allocating/deactivating resources that are likely to be idle, or by consolidating resource instances), given the requirements indicated in the resource report. Representations of the scale-up or scale-down decisions may be transmitted to the customer resource intermediary 117, and the corresponding actions may be initiated by the intermediary at the appropriate resource providers 170 in the depicted embodiment. The allocation changes may result in event notifications being sent to the affected ESIs 153, which may then schedule various jobs from queues 154 onto the appropriate resources of the RPs in various embodiments.

Any desired combination of a wide variety of resources may be allocated or activated for clients' batch jobs in different embodiments, such as guest virtual machines instantiated at a virtualized computing service 170A, physical hosts or servers, storage devices of a storage service 170B, database instances, graphics processing devices (e.g., GPU-based appliances or virtual machine), appliances optimized for machine learning, program execution containers, and the like. At a given point in time, the resources of a given compute environment may be in one of several states in various embodiments. For example, in one embodiment a given resource may be allocated and in-use (executing or assisting with the execution of a running job), allocated and free (available for execution of a pending job if one exists, but not currently designated for any particular job), or unallocated (yet to be allocated and designated for a job, although the constraints of the compute environment permit such an allocation). In one implementation, some free resources may be placed in a dormant or deactivated state, from which they may be transitioned to an activated state when assigned to a job.

Mappings Between Queues and Compute Environments

Figure 2:
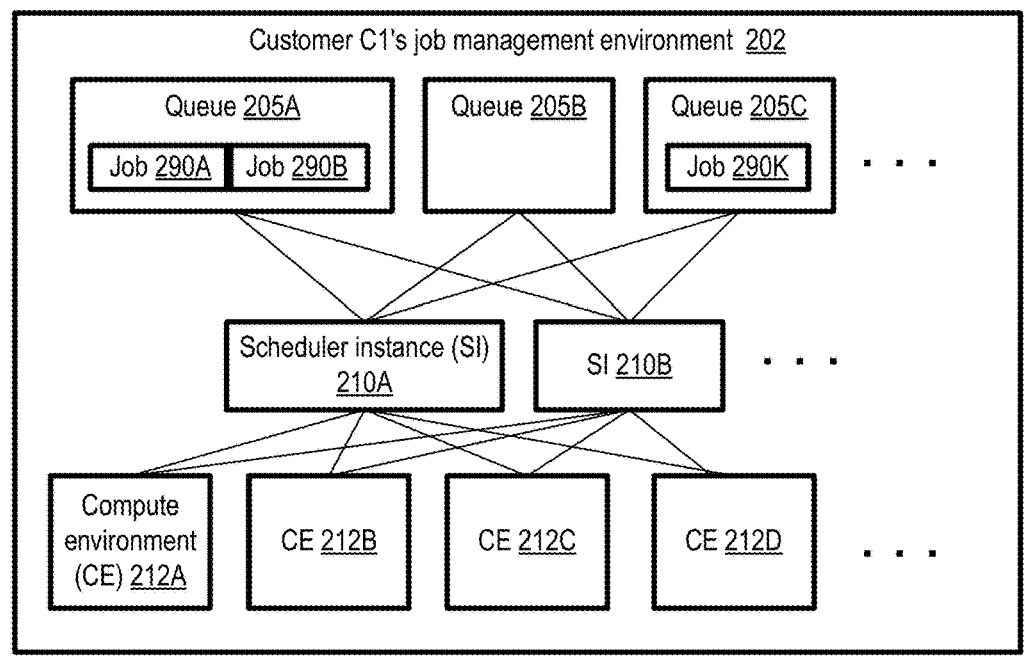
FIG. 2 illustrates examples of relationships between job queues, compute environments, and schedulers, as well as example data structures which may be used for batch job management, according to at least some embodiments.
Figure 2:
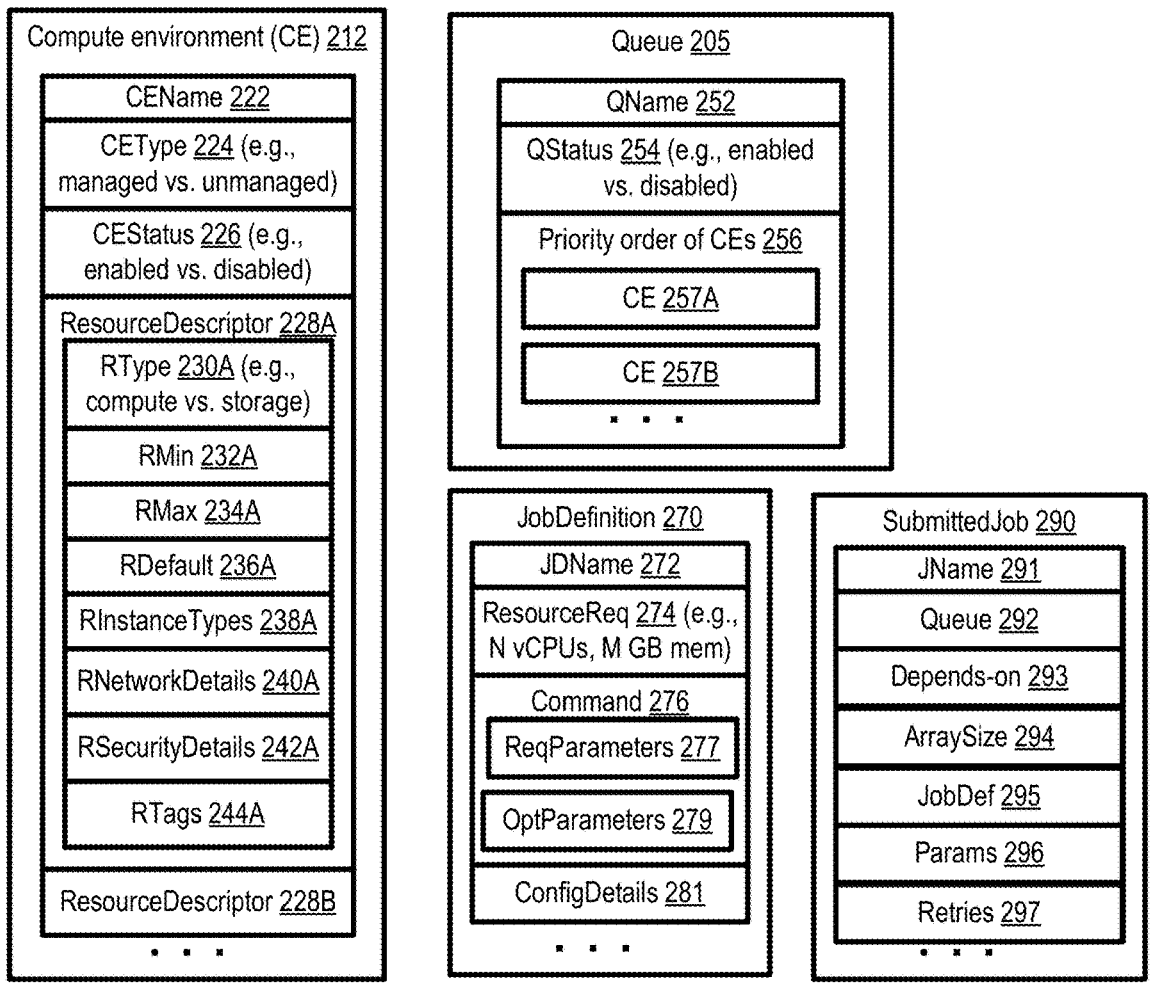

FIG. 2 illustrates examples of relationships between job queues, compute environments, and schedulers, as well as example data structures which may be used for batch job management, according to at least some embodiments. As shown, a given customer's (C1's) job management environment 202 may comprise some number of job queues 205 (e.g., queues 205A-205C), some number of compute environments 212 (e.g., CEs 212A-212D), and some number of scheduler instances 210 (e.g., 210A or 210B). As mentioned earlier, a given compute environment may represent a logical grouping of resources with associated constraints specified by a client. The resources of a given compute environment may in effect represent placeholders in the depicted embodiment, for which corresponding actual resources (such as virtual or physical machines or devices) may be allocated as and when needed. Submitted jobs 290 of a given queue (such as jobs 290A and 290B of queue 205A, or job 290K of queue 205C) may be fulfilled using resources corresponding to one or more compute environment 212, and a given compute environment 212 may be used for executing jobs from several different queues 205 in the depicted embodiment, so that an m:n relationship may be said to exist between queues and compute environments. A given scheduler instance 210 may be configured to schedule the executions of the jobs of one or more queues 205 at the appropriate set of compute environments associated with the queues in the depicted embodiment. In other embodiments, the relationships between queues and scheduler instances may be more constrained—e.g., a given scheduler may be responsible for exactly one queue in one embodiment.

Contents of data structures or objects which may be used to represent compute environments, queues, job definitions and jobs (submitted instances of the job definitions) are also shown with respect to the depicted embodiment. An object representing a compute environment 212 may include, for example, respective entries for a unique name or identifier (CEName 222), a type (CEType 224), a status (CEStatus 226), and one or more resource descriptors indicative of the kinds and numbers of resources that the environment may include. The CEType element may be set, for example, to "managed" or "unmanaged" in the depicted example scenario. In a managed environment, resource allocations may be handled by the batch job management service, while in an unmanaged environment, changes to resource allocations may have to be requested by the client on whose behalf the unmanaged environment is set up. Unmanaged compute environments may be useful, for example, for special-purpose jobs which require custom configuration of resources, or which require resources outside the provider network at which the job management service runs. The CEStatus field may indicate whether the compute environment 212 is currently enabled (i.e., usable for jobs) or disabled.

A resource descriptor 228, such as 228A or 228B, may comprise several subfields in the depicted embodiment. An RType subfield (230A in the case of resource descriptor 228A) may indicate a resource type (such as compute or storage). The RMin, RMax and RDefault subfields 232A, 234A and 236A may indicate, respectively, the minimum permitted resources of RType, the maximum permitted resources of RType, and a default amount of resources of RType which are to be instantiated or enabled when the compute environment is initially enabled. The units for the minimum, maximum, and default resource amounts may vary depending on RType—for example, for virtual or physical CPUs, the units may be integer processor counts, while for memory or storage, the units may be expressed in gigabytes or the like. In some cases, the resources of a given RType (such as virtual machines) may be classified into several instance types, and the RInstanceTypes subfield 238A may indicate the instance types permitted in the compute environment. For example, in one embodiment, virtual machines may be available in three instance types from a virtualized computing service: small, medium and large, with one large instance the logical equivalent of eight small instances or four medium instances. As such, it may be possible to consolidate small instances of a given compute environment into logically equivalent medium or large instances, or to split large instances into logically equivalent smaller instances, and such consolidation or split decisions may be made by the resource controller in some embodiments. In some embodiments, some resource instances may differ from others based on an acquisition mode—e.g., some virtual machines may be reserved for long periods, others may be acquired on demand, while others may be acquired using a spot-pricing mechanism if the resource provider has sufficient free resources. The RInstanceTypes subfield may indicate the acquisition mode in at least some such embodiments. In at least some embodiments, a resource descriptor may also include information about networking constraints (e.g., a particular subnet or isolated virtual network to be used for the resources, indicated via subfield RNetworkDetails 240A), security constraints (indicated via RSecurityDetails 242A), and/or text tags (RTags 244A) that a client wishes to use to classify the resource descriptor.

A queue object 205 may have an associated identifier QName 252, a status field QStatus 254 (e.g., settable to enabled or disabled), and a priority ordering 256 of compute environments (CEs) which are to be used for jobs of the queue in the depicted embodiment. If CE 257A is assigned a higher priority than CE 257B for a given queue, an attempt to find resources in CE 257A for a given job of the queue may be made first, and an attempt to find resources from CE 257B may be made only if CE 257A does not have enough resources for the job.

A job definition object 270 may comprise fields for a unique name (JDName 272), resource requirements 274 for each submitted job instance corresponding to the job definition, a command 276 to be executed for fulfilling the job instance, and in some cases other configuration details 281 in the depicted embodiment. Required and optional parameters 277 and 279 respectively for the command may be indicated in a job definition in some embodiments. In some embodiments, a given job queue may be designated exclusively for jobs with a single job definition. In other embodiments, a given job queue may be used for instances of several job definitions.

In the depicted embodiment, a submitted job object 290 (which may also be referred to as a job instance) may comprise a job name (JName 291), an identifier of the queue 292 into which the job is to be inserted, and Depends-on information 293 indicating dependencies on other jobs (e.g., whether the job can only be started under certain conditions regarding the status of one or more other jobs). An ArraySize field 294 may be set to an integer greater than one to submit a set of jobs which can be executed concurrently (if sufficient resources are available) in some embodiments. The definition of the job may be indicated via the JobDef field 295, actual parameters for the job's command may be indicated via Params field 296, and a maximum number of attempts to be made to execute the job may be indicated via the Retries field 297. It is noted that various other fields and sub-fields may be used for the different kinds of objects or data structures shown in different embodiments; the example fields shown are not intended to be restrictive. In various embodiments respective programmatic interfaces of the batch job management service may be utilized by clients to create, view/list, delete or modify the kinds of data structures shown in FIG. 2. For example, application programming interfaces (APIs) for compute environments may include createComputeEnvironment, listComputeEnvironments, updateComputeEnvironment, deleteComputeEnvironment and the like in one embodiment. Programmatic interfaces other than APIs, such as web-based consoles, command-line tools or graphical user interfaces may be use by clients to interact with the batch job management service in at least some embodiments.

Resource Report Contents

Figure 3:
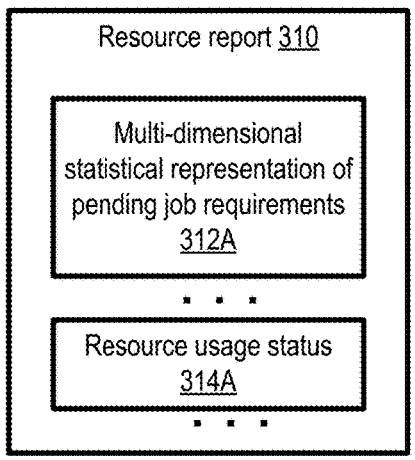
FIG. 3 illustrates example contents of a resource report which may be generated by a scheduler, according to at least some embodiments.
Figure 3:
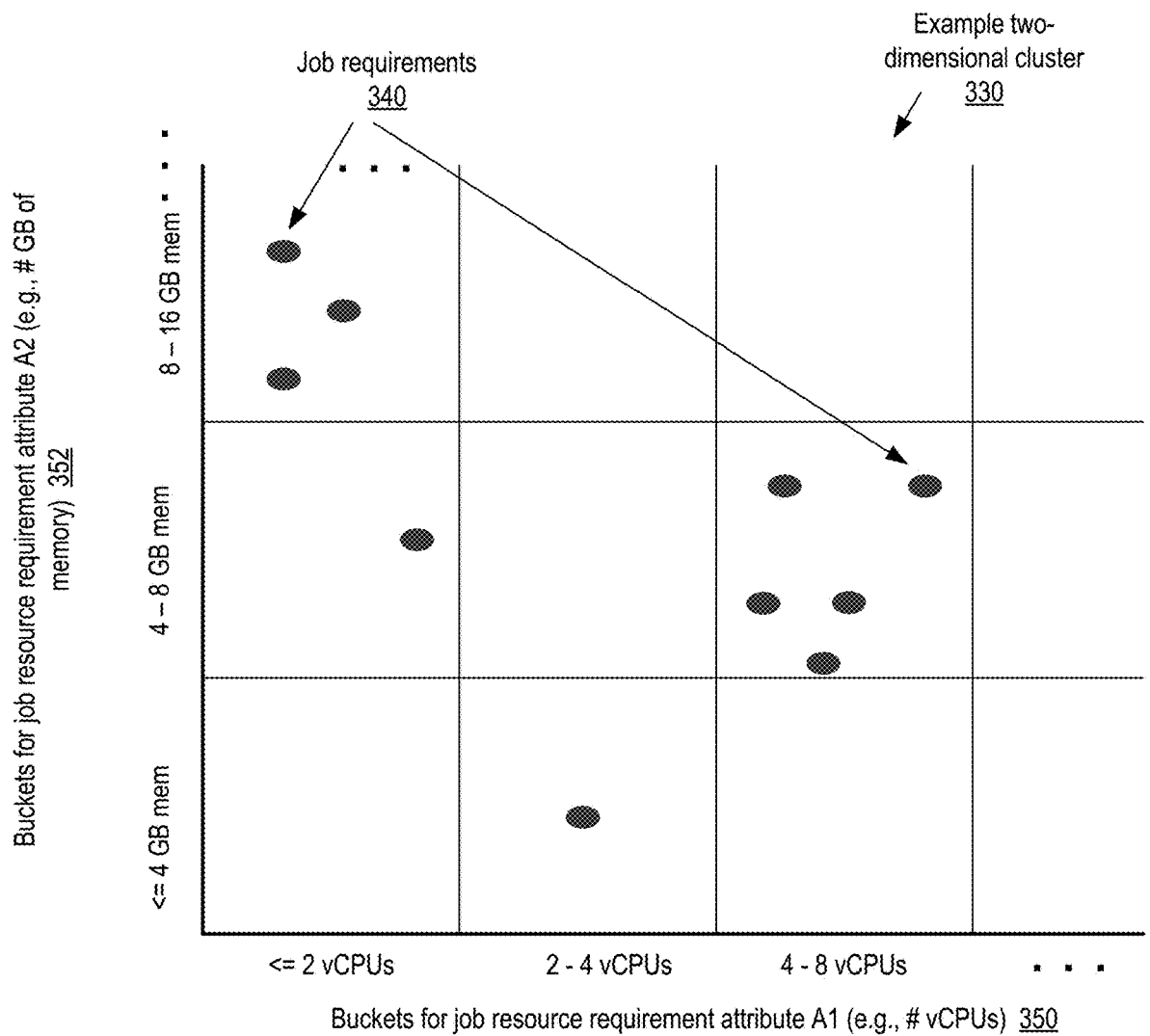

FIG. 3 illustrates example contents of a resource report which may be generated by a scheduler, according to at least some embodiments. As shown, a resource report 310 may comprise at least one multi-dimensional statistical representation of pending job requirements 312A, and at least one resource usage status report 314A. In some embodiments, a respective statistical representation 312 may be produced for each queue for which the scheduler is responsible, and a respective resource usage status object 314A may be generated for each compute environment available for the queue or queues being managed by the scheduler. In other embodiments, a consolidated statistical representation of the pending job requirements of more than one queue may be created, and/or a consolidated resource usage status object may be created for more than one compute environment. As indicated earlier, the resource report 310 may be generated in some embodiments in response to an event notification received by the scheduler, and the resource report may be transmitted to a resource controller of the service. In at least one embodiment, resource reports may submitted periodically (e.g., once every T seconds or minutes) by each scheduler as part of a "heartbeat" mechanism which informs the resource controller that the scheduler is still active, e.g., in addition to or instead of being submitted after being triggered by event notifications associated with job state changes. In effect, a notification generated by a timer or other similar timeout mechanism may be considered another example of an event to which a scheduler may respond by generating a resource report. In one embodiment, a resource report may only be generated by a scheduler if there is at least one pending job whose resource requirements are such that the job cannot be scheduled using the free resources of the compute environments associated with the queue to which the job belongs.

A two-dimensional cluster 330 represents one example of a multi-dimensional representation of requirements 340 of the pending jobs of a given queue in the embodiment depicted in FIG. 3. The two resource attributes or dimensions included in the representation are (a) the number of virtual CPUs (vCPUs) required per job and (b) the amount of memory, in gigabytes, required per job. A clustering algorithm may be used to group the vCPU requirements into at least three buckets: <=2 vCPUs, between 2 and 4 vCPUs, and between 4 and 8 vCPUs. Then, with respect to the jobs of each vCPU cluster, the distribution of memory requirements may be used to group the jobs into at least three memory-requirement buckets: <=4 gigabytes, between 4 and 8 gigabytes, and between 8 and 16 gigabytes. As a result of the two-dimensional clustering, the jobs may be grouped into four distinct clusters: one cluster with a population of 5 jobs corresponding to the combination (4 to 8 vCPUs, 4 to 8 GB of memory), a second cluster with a population of 3 jobs corresponding to (<=2 vCPUs, 8-16 GB memory), a third cluster of a single job corresponding to (<=2 vCPUs, 4-8 GB memory), and fourth cluster of a single job, corresponding to the combination (2-4 vCPUs, <=4 GB memory). Respective tuples may be created as discussed below for each of the 2-dimensional buckets with non-zero populations in various embodiments by a scheduler, indicating the required values of the attributes for the individual buckets and the corresponding job populations, and transmitted in a resource report to the resource controller.

In various embodiments, the boundaries of the buckets for each of the attributes (e.g., boundaries of buckets 350A and 350B) may be identified using any appropriate range splitting approaches—e.g., boundaries corresponding to commonly-used resource configurations may be used, such as multiples of 2 GB for memory. In the depicted example, the boundary selection has resulted in fairly unbalanced clusters—with a minimum cluster population of 1 out of a total population of 10 jobs, and a maximum cluster population of 5 jobs. In at least some embodiments, a more balanced clustering approach may be used than that shown in FIG. 3: e.g., a recursive binary splitting algorithm of the kind shown in FIG. 9 may be employed in an attempt to achieve buckets with roughly equal populations, which may be more conducive for certain kinds of resource allocation algorithms employed at the resource controller. In at least one embodiment, a clustering machine learning algorithm (such as any of various versions of k-means clustering) may be employed to automatically generate the multi-dimensional statistical distribution for a resource report.

Queue Size-Independent Representations of Job Resource Requirements

Figure 4:
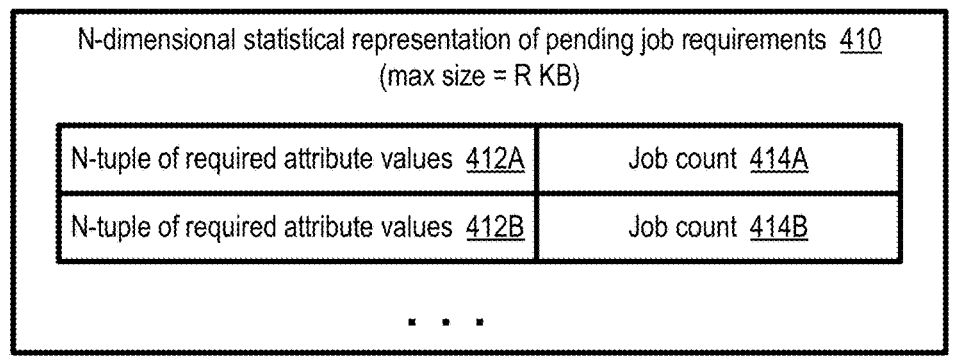
FIG. 4 illustrates examples of space-efficient representations of resource requirements which may be generated by batch job schedulers, according to at least some embodiments.
Figure 4:
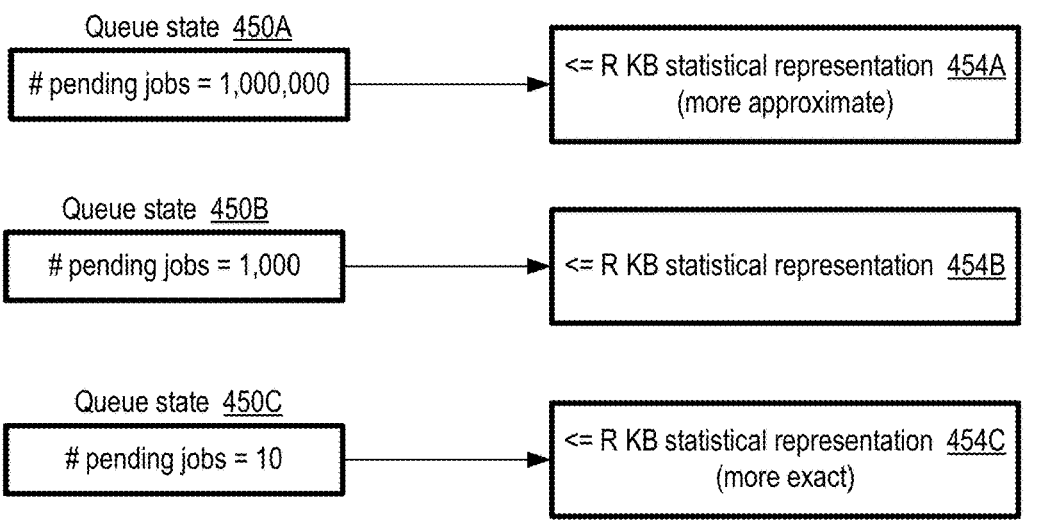

FIG. 4 illustrates examples of space-efficient representations of resource requirements which may be generated by batch job schedulers, according to at least some embodiments. In a scenario in which N distinct requirement attributes are being considered, a statistical representation 410 of resource requirements of pending jobs of one or more queues may comprise one or more N-tuples of required resource attribute values 412, such as N-tuples 412A and 412B, corresponding to the multidimensional buckets with non-zero populations which were identified by the scheduler. Corresponding to each of the N-tuples, a respective job population count 414 (e.g., 414A or 414B) may be included in the statistical representation. In the depicted embodiment, a maximum size of R kilobytes has been designated for the statistical representation, which may constrain the number of tuples or buckets which can be included in the representation. As a result of such a size limit, the information conveyed via the statistical representation may vary in accuracy or exactness regarding job requirements in the depicted embodiment; for larger queue sizes, the requirement information may be expressed in a more summarized form, losing some of the accuracy while ensuring that the size of the resource report message to the resource controller remains unchanged compared to the size used for smaller queue sizes.

The two-dimensional distribution of vCPU and memory requirements, shown in FIG. 3, may be represented by the corresponding 2-tuple example 430. As shown, a total of four 2-tuples, each indicating the required number of vCPUs and the required amount of memory for each bucket, may be generated. Recall that each bucket corresponded to a range of values (e.g., between 4 and 8 GB of memory, or between 2 and 4 vCPUs) in the example shown in FIG. 3. From the range for each attribute for each bucket/cluster, a corresponding aggregate required value may be determined in various embodiments based on attribute-dependent rules. Thus, if a particular bucket indicates a range of 2-4 vCPUs, in the depicted embodiment the required number of vCPUs may be set to the maximum value of the range (4 vCPUs), e.g., because allocating less than the maximum value may potentially result in a job from that bucket not being able to complete its execution in a targeted timeframe. In contrast, according to the rule being enforced with respect to memory, the mean value of the range for the memory attribute may be set as the required value in the depicted example (e.g., based on the assumption that a job may be able to execute with reasonable performance with somewhat less memory than indicated in its definition). In the case of the fourth tuple shown, for example, the memory required value is set to 12 GB, corresponding to a range of 8-16 GB of memory for the bucket.

As mentioned above, the size of the representation of job requirements may be limited to a maximum of R kilobytes in the embodiment shown in FIG. 4. If each of the N-tuples and the corresponding job population information occupies a maximum of M bytes, this means that the maximum number of tuples that can be included is approximately floor(R*1024/M) in the depicted example. As the combination of N required values of each N-tuple corresponds to a single point in the N-dimensional space, this means that, as the total number of jobs being represented increases, the accuracy or exactness of the requirements may decrease, since more and more job requirements may be mapped onto a single point. Three job queue sizes and the corresponding statistical representations are depicted in FIG. 4. In queue state 450C, the number of pending jobs is quite low (10), and as a result the corresponding statistical representation 454C may be quite accurate or exact. E.g., the 10 jobs may potentially be represented by 10 different buckets, so the requirements for each job may be indicated exactly. In queue state 450B, there may be 1000 pending jobs being mapped to roughly the same number of tuples, so the accuracy of the requirement information may be somewhat less, whole the size of the resource report containing representation 454B may remain more or less unchanged. Even if the queue size is a million jobs as in queue state 450A, the size of the resource report containing representation 454A may remain unchanged, although the requirement data may be somewhat more approximate than in the 10-job or 1000-job case. In some embodiments, the size of the resource requirement representation may be a tunable parameter of the system or service, and may therefore be adjusted as needed to achieve desired tradeoffs between resource report message size and accuracy.

Example Dimensions of Job Resource Requirements

Figure 5:
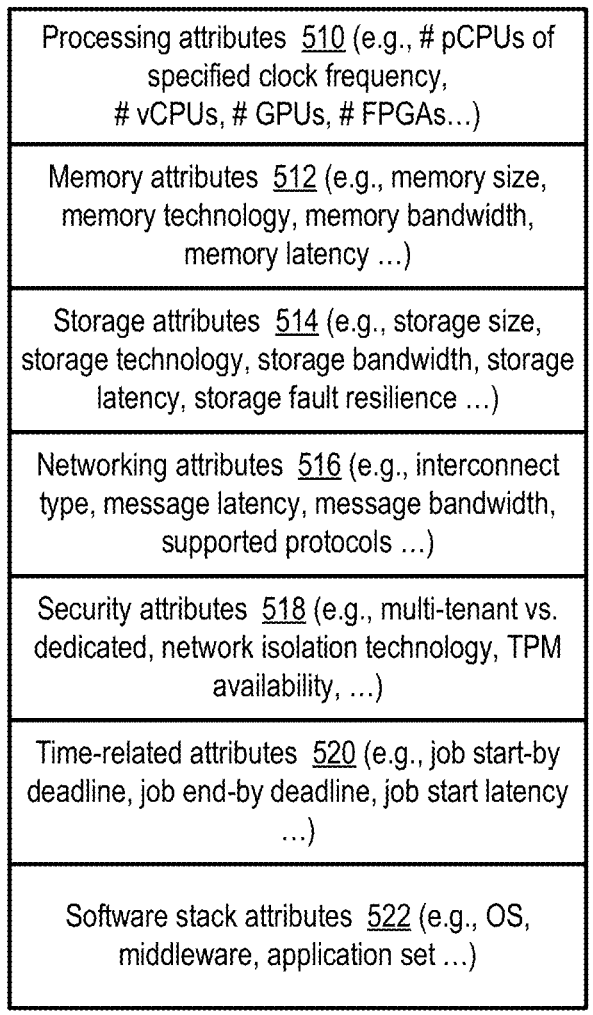
FIG. 5 illustrates examples of resource attributes which may be represented in resource requirements generated by batch job schedulers, according to at least some embodiments.

FIG. 5 illustrates examples of resource attributes which may be represented in resource requirements generated by batch job schedulers, according to at least some embodiments. Any desired combination of several categories of resource attributes may be used to indicate job requirements in different embodiments. As shown, the attributes 502 may be classified into at least the following categories in the depicted embodiment: processing attributes 510, memory attributes 512, storage attributes 514, networking attributes 516, security attributes 518, time-related attributes 520, and software stack attributes 522. It is noted that for at least some attributes, the feasible range of values may not necessarily be numerical in various embodiments—instead, for example, categorical values may be appropriate in some cases. Furthermore, in those cases in which the feasible range of values is numerical in a given embodiment, the feasible values may be discrete (e.g., integers only) in some cases and continuous (e.g., real-valued) in others.

With respect to processing, depending on the kinds of jobs a client wishes to run, the attribute values 510 may indicate the number of physical CPUs (pCPUs) having a particular clock frequency, virtual CPUs (vCPUs) with a specified computation capacity, GPUs, FPGAs (Field Programmable Gate Arrays), or the like in the depicted embodiment. With respect to memory attributes 514, memory size (e.g., expressed in gigabytes as in the examples above), memory technology (e.g., the type of SDRAM, DDRAM etc. to use), the memory bandwidth, and/or the memory latency may be represented as distinct requirements in some embodiments.

Storage attributes 516 may be used to indicate, for example, requirements for storage size, storage technology, storage bandwidth, storage latencies for various object sizes, fault resilience levels, and so on. Networking attributes 516 may indicate, for example, preferred interconnect types, message latencies for various message sizes, bandwidth, supported networking protocols, etc.

Security attributes 518 may indicate, for example, requirements for multi-tenant versus dedicated resources, the type of network isolation technology being supported at the resources, the availability of TPMs (trusted platform modules), and the like. Time-related attributes may include, for example, deadlines for staring or ending the jobs (start-by or end-by deadlines), the maximum delay between requesting a job and the initiation of the job (startup latency), Software stack related attributes may indicate, for example, desired operating system versions, middleware programs, application stacks and so on. It is noted that in various embodiments, only a subset of the attributes indicated in FIG. 5 may be considered when specifying job requirements (e.g., in job definitions or in job submissions), and therefore only a subset may be represented in the resource reports. Other attributes, not shown in FIG. 5, may be used to indicate additional characteristics of the resources needed for the jobs in some embodiments.

Example Factors Considered in Resource Allocation Change Decisions

Figure 6:
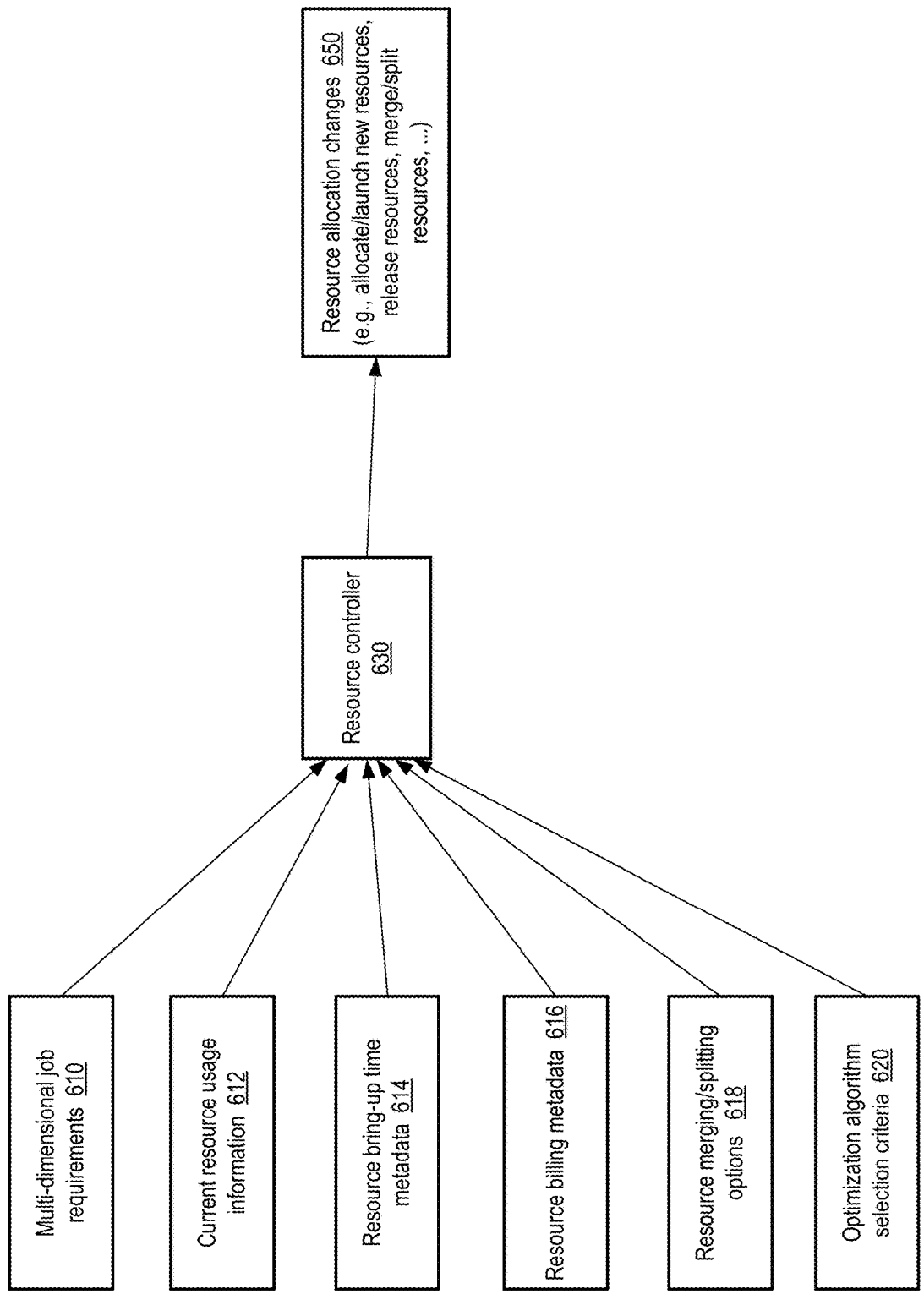
FIG. 6 illustrates examples of factors which may be taken into account to determine resource allocation changes by a resource controller, according to at least some embodiments.

As mentioned earlier, a scheduler may transmit resource reports, e.g., in response to event notifications and/or based on a schedule, to a resource controller in various embodiments. FIG. 6 illustrates examples of factors which may be taken into account to determine resource allocation changes by a resource controller, according to at least some embodiments. In addition to the multi-dimensional job requirements 610 and the current resource usage information 612, which may be included in the resource reports received from the scheduler, a resource controller 630 may also consider several other parameters when making its decisions in the depicted embodiment. (It is noted that the resource usage information 612 may be collected from sources other than the resource reports in at least one embodiment—e.g., the resource controller may be provided resource usage data by various monitoring services affiliated with the resource providers being used for the batch jobs.)

Resource bring-up time metadata 614 may indicate the time it takes to start up or activate various types of resources, such as guest virtual machines, storage devices, and the like. Some clients may have applications which may not work well if there are long delays between the time a job is submitted and the time at which the job's execution begins. In one embodiment, the resource controller may decide to keep a pool of resources with relatively long bring-up times activated even if there are no jobs currently queued, so that if and when jobs needing such resources are submitted, the jobs can begin execution more quickly than if new instances of the resources had to be activated.

Resource billing metadata 616 may include the granularity at which clients are billed for resources allocated on their behalf—e.g., some resources may be billed at per-hour granularity, others on a per-minute or per-day granularity. The granularity may impact the controller's decisions as to exactly when an idle resource should be freed or de-allocated. For example, consider the case of a resource with a per-hour billing granularity, which is allocated to a client but has remained idle for some threshold time and is therefore a candidate for release. If, at the time that the decision regarding possibly releasing the resource is to be made, a new billing hour has recently begun for the resource, it may be reasonable to retain the resource until (say) ten minutes before the hour completes, as there would be no savings accrued to the client by releasing the resource immediately, and there may be a non-zero probability that a new job which could use the resource may be submitted by the client before the current billing hour completes.

In some cases, as mentioned earlier, resources may be classified into size-based or capability-based resource instance categories. For example, compute instances (guest virtual machines) of a virtualized computing service may be designated as being large, medium or small in one implementation, with the computing capacity of a large compute instance being (approximately) K times the computing capacity of a medium compute instance, and the computing capacity of a medium compute instance being (approximately) L times the computing capacity of a small compute instance. As such, from the perspective of computing capacity, K*L small compute instances could, at least in principle, be replaced by one large compute instance or by K medium instances, and vice versa. Depending on the preferences of the clients, the batch job management service's own rules for consolidating/splitting resources when possible, the requirements of the pending jobs, and the applicable resource merging/splitting options 618 available, the resource controller could decide to substitute resource instances of one type with logically equivalent resources instances of other types in some embodiments. In one embodiment, for example, it may reduce billing costs (and/or administrative resources consumed) to use M instances of one type rather than N instances of another type.

A number of different optimization algorithms may be available for mapping pending jobs to resources in some embodiments, given the compute environment constraints of the client. For example, a biggest-job-first bin-packing algorithm may be available, a first-in-first-out algorithm may be available in which the sizes of the resource requirements are not used to determine the order in which resources are allocated, various priority-based algorithms may be available, and so on. The particular optimization algorithm selected for a given queue or a given client may be governed by criteria 620, which may be indicated by the client programmatically (e.g., at the time of queue creation) or determined by the job management service in various embodiments. In at least one embodiment, the resource controller may monitor the completion rates or jobs for various queues, and change the optimization algorithm (or adjust the algorithm's parameters) based on analysis of the monitored data.

Any combination of the different criteria shown in FIG. 6 may be used by resource controller 630 to determine resource allocation changes 650 (such as allocating/launching new resources, releasing allocated resources for potential use by other clients, merging or splitting resources, and the like) in the depicted embodiment. Other factors, not shown in FIG. 6, may also be taken into account in some embodiments.

Provider Network Environment

Figure 7:
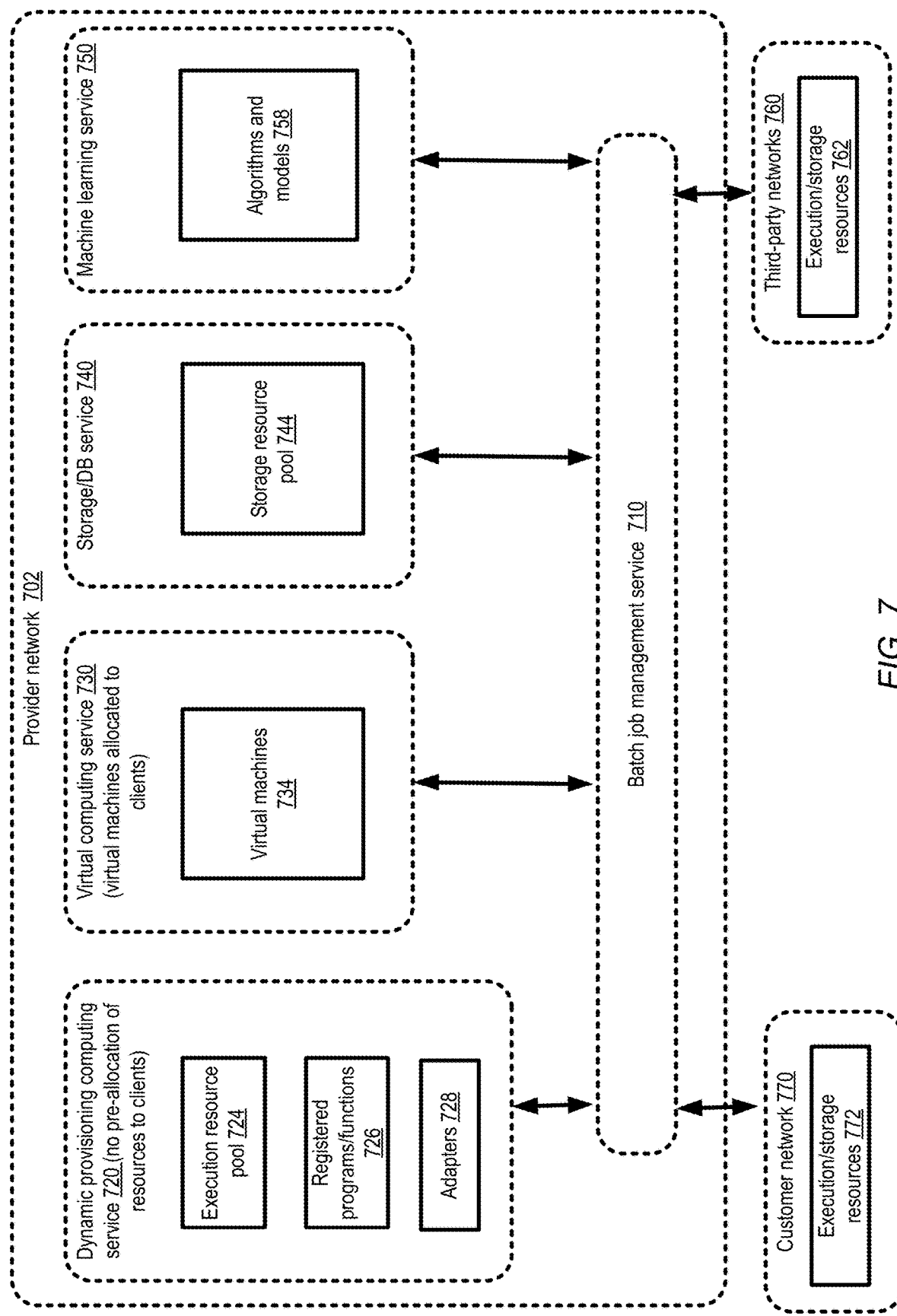
FIG. 7 illustrates an example provider network environment at which a service for managing batch jobs may be implemented, according to at least some embodiments.

FIG. 7 illustrates an example provider network environment at which a service for managing batch jobs may be implemented, according to at least some embodiments. As shown, provider network 702 may comprise, in addition to batch job management service 710, a dynamic provisioning computing service 720, a virtual computing service 730, one or more storage or database services 740, and a machine learning service 750. In the depicted embodiment, the batch job management service 710 may utilize resources of one or more of the other services, e.g., to execute jobs submitted by clients and/or to perform one or more control-plane functions of the batch job management service itself. For example, in one embodiment, with respect to control plane functions, storage resources from pool 744 may be used to house persistent representations of some or all of the data objects discussed earlier in the context of FIG. 2, compute resources of services 720 or 730 may be used to execute optimization algorithms for resource allocation decisions, machine learning algorithms from service 750 may be used to cluster pending job requirements by schedulers, and so on.

A dynamic provisioning computing service 720 may enable clients to register executable programs for execution without pre-allocating execution platforms for the clients (and hence may sometimes be referred to as a "server-less" computing service). A program may be submitted at service 720 by a client, and one or more triggering conditions which are to cause the execution of the program (such as the scheduling of a job by a scheduler of the batch job management service) may be indicated. Instead of reserving or provisioning compute resources for the client in advance, the service 720 may simply select compute resources for a registered program 726 from a pool 724 of execution platforms whenever execution of the program is triggered. The client may not even be aware of the kind of virtual or physical machine used to execute the program, and may simply be provided with the result of the execution. As such, clients of the dynamic provisioning computing service may not have to be concerned with identifying the number or computing capacities of platforms to be used for their programs, and may only be charged for the amount of computing actually performed when their programs are executed (measured, for example, in relatively fine-grained increments of seconds or even fractions of seconds of computation) in at least some embodiments. The computing resources offered by such a service 720 may be an ideal fit for implementing some types of jobs. In the depicted embodiment, dynamic provisioning service 720 may also make a number of adapters 728 accessible to the registered programs, enabling the registered programs to utilize resources external to the service 720. As a result, a program registered for execution at service 720 may be able to access resources, for example, at other services of the provider network and/or outside the provider network.

In contrast to the dynamic provisioning service 720, the virtualized computing service 730 may pre-allocate computing resources (e.g., virtual machines) to its clients in a somewhat more static fashion, e.g., for specified time intervals, and enable the clients to run programs on the allocated virtual machines. In at least some embodiments, programs running on such virtual machines may be used for batch jobs. Some such programs may implement web services interfaces, enabling a given program to be utilized by transmitting commands to an HTTP (HyperText Transfer Protocol)-based address associated with the program. Various infrastructure management capabilities supported at the virtualized computing service, such as automated scaling and load balancing, may be utilized by the batch job management service. Programs run to implement batch jobs at the virtualized computing service 720 and/or the dynamic provisioning computing service 710 may invoke each other (or other programs at other services) in some embodiments—that is, a given job may not be restricted to utilizing resources of a given service of the provider network.

In various embodiments, one or more storage and/or database services 740 may also be utilized for executing batch jobs. For example, data sets used for analytics jobs may be stored at such services, intermediate or final results of job executions may be stored at such services, and so on. As mentioned above, various data objects used for job management, such as objects representing queues, submitted job instances, compute environments, and the like may also be stored at such services.

Some provider networks may include a machine learning service 750 which can be utilized by various other services and/or by external clients directly. The machine learning service 750 may provide a variety of algorithms and models 758, such as various models for supervised or unsupervised learning, which may be invoked by some jobs submitted to the batch job management service 710. Clustering algorithms of the machine learning service may be invoked by job schedulers of the batch job management service in some embodiments to generate the multi-dimensional statistical representations of job requirements.

For some jobs submitted to batch job management service 710, resources outside the provider network 702 may be used, e.g., at execution or storage resources 772 located within application-owner networks 770 or at execution or storage resources 762 located in third-party networks 760 (e.g., networks owned or managed by a third party application vendor or service vendor, other than the client submitting the jobs and other than the provider network operator). Other resources or services inside or outside the provider network may be used for batch jobs in various embodiments. In some embodiments, the batch job management service 710 may simplify the integration required to utilize the various types of resources, e.g., by automatically invoking appropriate communication modules, formatting modules, data structure transformation code, plug-in modules and the like when executing the jobs. It is noted that at least in one embodiment, the techniques associated with resource allocation decisions discussed herein may be implemented without utilizing a provider network.

Methods for Resource Allocation for Batch Jobs

Figure 8:
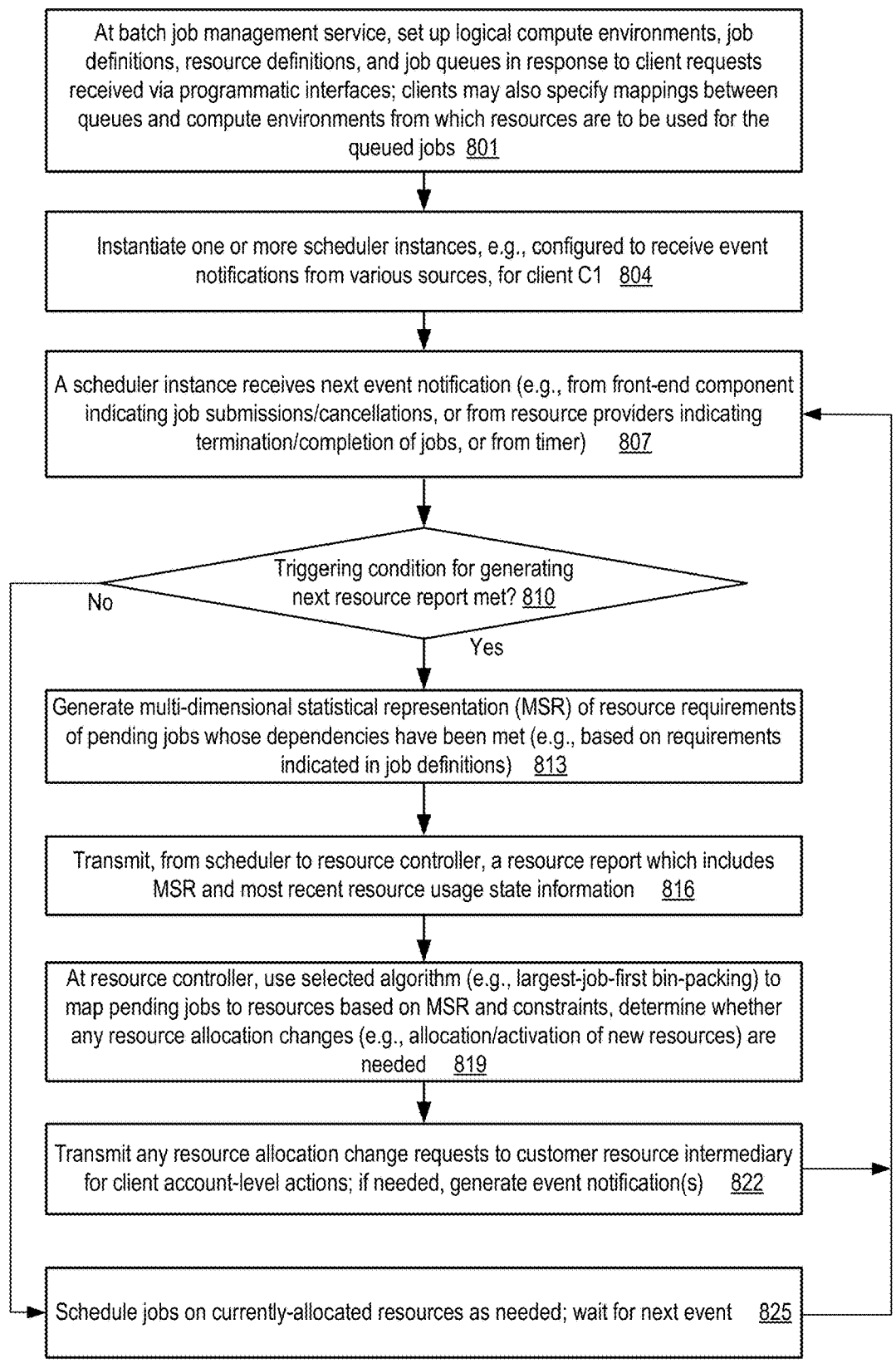
FIG. 8 is a flow diagram illustrating aspects of operations which may be performed by schedulers and resource controllers of a batch job management service, according to at least some embodiments.

FIG. 8 is a flow diagram illustrating aspects of operations which may be performed by schedulers and resource controllers of a batch job management service, according to at least some embodiments. As shown in element 801, at a batch job management service, compute environments, job queues, job definitions and resource definitions may be set up or established, e.g., in response to programmatic requests submitted via clients of the service. Mappings between queues and compute environments, e.g., indicating the order in which different compute environments should be considered when attempting to find resources for a given job of a given queue, may also be indicated programmatically by clients in the depicted embodiment. Any combination of a variety of programmatic interface types may be used in various embodiments, such as a set of APIs, a web-based console, a command line tool, or a graphical user interface.

One or more scheduler instances (e.g., respective processes or threads of execution) may be instantiated to handle the jobs associated with one or more queues created on behalf of a client (element 814). The schedulers may be event-driven in at least some embodiments—e.g., they may receive event notifications from various sources, and take actions in response to the events, remaining largely idle during intervals in which no notifications are received. The event sources may, for example, include components of the batch job management service, such as front-end request handlers (which may generate events when requests for job submissions, terminations, completions or cancellations are received), resource controllers, and the like, resource monitoring agents associated with various resource providers (such as some of the other provider network services shown in FIG. 7), and so on. In some embodiments, timer events may also cause a scheduler to take actions—e.g., a scheduler may be configured to prepare and transmit a heartbeat message periodically to a resource controller.

The next event notification may be received at a given scheduler (element 807), e.g., from a front end request handler indicating submissions, completions, cancellations or terminations of one or more jobs, from resource providers indicating completion/termination of one or more jobs, or from a timer indicating that a message is to be sent to a resource controller. In response, the scheduler may examine the state of one or more job queues and make a determination as to whether a new resource report is to be generated. In some cases, the scheduler may not need to transmit a resource report—e.g., if there are no outstanding or pending jobs in its queue(s) which can be executed, or if the resources which are already usable by the scheduler are sufficient to execute the set of pending runnable jobs.

If the scheduler determines that a triggering condition for generating a resource report has been met (element 810), e.g., if there is at least one pending job whose dependencies (if any) have been met and for which insufficient resources are available to the scheduler, the resource requirements of at least a subset of the pending runnable jobs may be examined in the depicted embodiment. A multi-dimensional statistical representation (MSR) of the requirements of such jobs may be created (element 813), e.g., using the kinds of clustering/bucketing techniques discussed earlier. In one embodiment, instead of generating buckets or clusters, measures such as mean requirements, median requirements, standard deviations of requirements, and the like may be provided for various attributes or dimensions in an MSR. In some embodiments, if the scheduler is responsible for multiple queues, one such MSR may be created for each queue; in other embodiments, a single MSR may be used to represent requirements from multiple queues. Additional details regarding the generation of an MSR are provided below in the context of FIG. 9 for some embodiments.

The scheduler may transmit a resource report which includes (a) the MSR(s) and (b) the most recent resource usage status information available at the scheduler to a resource controller in the depicted embodiment (element 816). The resource usage status may include data at various granularities in different embodiments—e.g., in one embodiment, measurements of CPU usage, memory usage and the like may be included for various hosts/servers, while in another embodiment, the mappings between running job and various resources may be included.

At the resource controller, a selected optimization algorithm such as a largest-job-first bin-packing algorithm, may be used to map pending jobs to resources given the constraints imposed for example by the compute environment definitions indicated by the client (element 819). The results of executing the optimization algorithm may indicate whether any resource allocation changes should be made—e.g., whether new resources that do not violate with the constraints should be allocated or activated, whether some resources can be freed or de-activated, etc. A wide variety of resources may be allocated/activated (or freed/de-activated) in different embodiments, such as guest virtual machines instantiated at a virtualized computing service, physical hosts or servers, storage devices, database instances, graphics processing devices, appliances optimized for machine learning, program execution containers, and the like. Additional details regarding a specific technique which may be used to map pending job requirements to resources in some embodiments are provided below in the context of FIG. 10.

If a determination is made that one or more allocation changes should be made, corresponding requests may be transmitted by the resource controller to a customer resource intermediary in the depicted embodiment (element 822). The intermediary may then initiate the requested actions, e.g., using the appropriate client credentials to issue allocation-related requests via programmatic interfaces of one or more resource providers such as various services of a provider network. It is noted that in at least one embodiment, an intermediary may not be used, and the resource controller may itself issue the resource requests to the appropriate providers.

If, in operations corresponding to element 810, the scheduler determines that a new resource report is not required, the scheduler may schedule pending jobs (if any) on currently allocated resources (element 825) and wait for the next event notification. When the next event notification is received, operations corresponding to elements 807 onwards may be repeated in the depicted embodiment.

Figure 9:
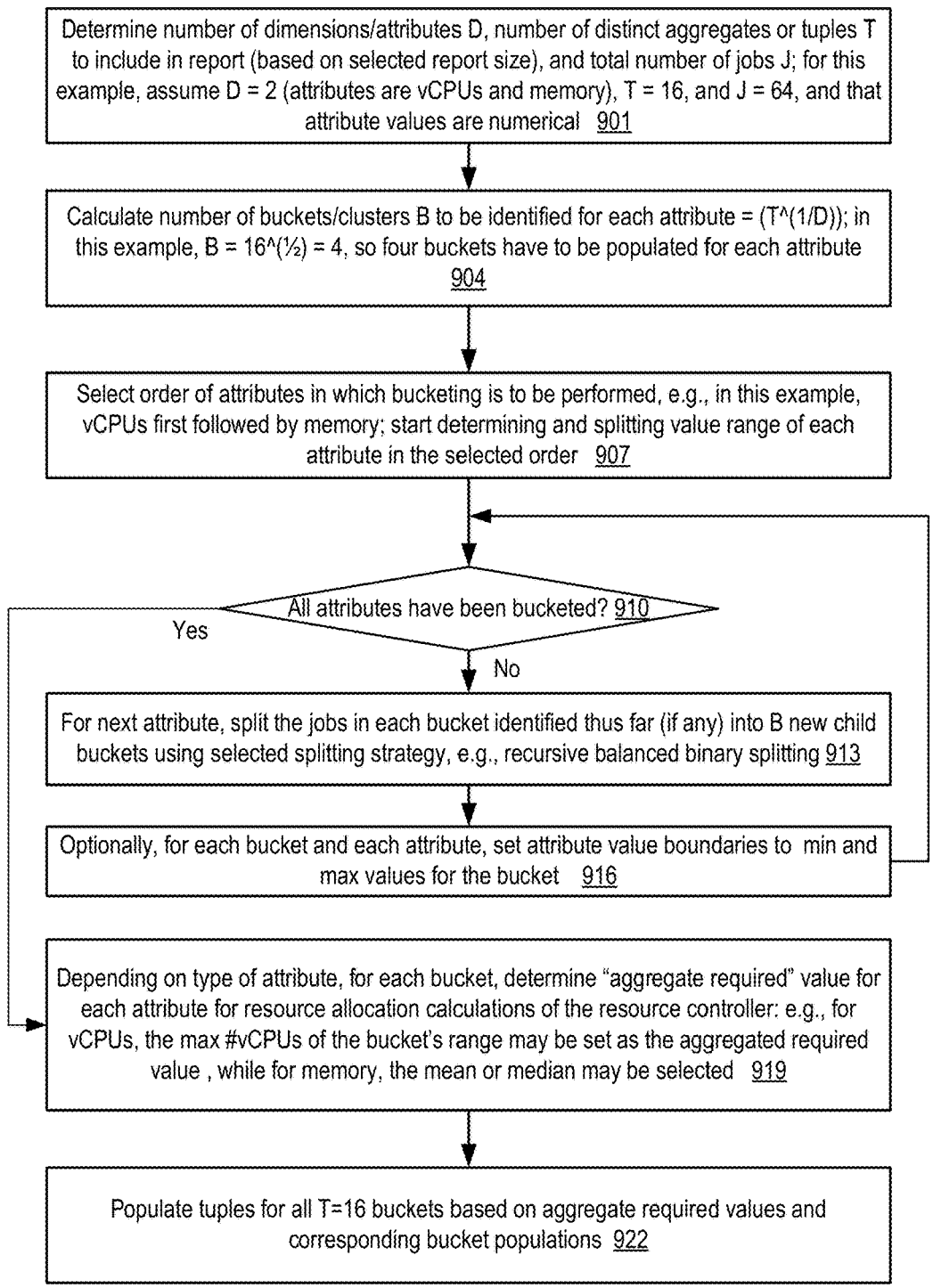
FIG. 9 is a flow diagram illustrating aspects of operations which may be performed to generate statistical representations of job requirements in one example scenario, according to at least some embodiments.

FIG. 9 is a flow diagram illustrating aspects of operations which may be performed to generate statistical representations of job requirements in one example scenario, according to at least some embodiments. In FIG. 9, to simplify the presentation, only two resource attributes or dimensions (the number of vCPUs and the number of gigabytes of memory) are considered for inclusion in the statistical representation by way of example, and both attributes are assumed to take on numerical values. It is noted that an approach similar to that illustrated in FIG. 9 may be applied regardless of the number of resource attributes/dimensions being considered, and regardless of whether the attributes values are numerical or not (for example, categorical attributes may be mapped to numerical values before the statistical analysis is performed). As shown in element 901, the number of distinct dimensions/attributes D, the number of distinct aggregates or tuples T to be included in the statistical representation (which may depend for example on the selected maximum size of the resource report), and the total number of jobs J which are to be represented may be determined. In the example scenario being considered, D is 2, T is 16 and J is 64.

A symmetrical statistical representation with respect to the number of distinct dimensions being considered in the depicted example scenario may be prepared—that is, an equal number of distinct buckets or clusters B may be targeted for each of the dimensions. As 16 tuples are to be generated taking 2 attributes into consideration, the number of buckets B for each attribute may be computed as $(16^{\wedge}(\frac{1}{2}))=4$ (element 904). In general, for a symmetrical treatment of D attributes, $T^{1/D}$ buckets may be created for each attribute in at least some embodiments. Such symmetry may not be imposed in some embodiments—that is, the number of buckets created for a given dimension or attribute may not necessarily be the same as the number of buckets created for at least some other dimension or attribute.

An order in which the attributes are to be bucketed may be selected (element 907), e.g., the vCPU requirements of the 64 jobs may be bucketed first, followed by the memory requirements for the jobs in each vCPU bucket. The range of values among the J pending jobs for the next dimension in the order (e.g., the range in the number of vCPUs required for the J jobs) may be determined and the splitting of the range may be begun.

As long as at least one attribute remains un-bucketed (as determined in element 910), each bucket created thus far may be split into B child buckets using a selected range splitting strategy, such as recursive balanced binary splitting (element 913). In the very first iteration of the splitting, the entire set of J jobs may be examined and split along the first dimension, since no buckets as such have been created yet in the depicted embodiment. In a recursive binary balanced splitting, the range of values being considered may be subdivided into two near-equal or equal sub-ranges. For example, if the eight values for vCPUs (1,4,4,4,4,8,8,12) were to be split using recursive balanced binary splitting into four buckets, in the first split the range 1-12 may be divided into two, resulting in (1,4,4,4,4) and (8,8,12). Then, the range of the larger of the two groups (if there is a larger sub-group) may be subdivided into 2 again: (1,4,4,4,4) may be split into (1) and (4,4,4,4), thus resulting in sub-groups (1), (4,4,4,4) and (8,8,12). At this point, the range of the largest sub-group (4,4,4,4) can no longer be split, and one more split is required to reach the targeted four buckets, so the range of the second-largest sub-group (8,8,12) may be split. The final four buckets may thus be identified as (1), (4,4,4,4), (8,8) and (12) in this example.

For each bucket identified using the split strategy, in the depicted embodiment, the range may optionally be set to the maximum and minimum actually indicated in the jobs of the bucket (element 916), rather than the numerical values obtained by the binary split. Thus, for example, if the range determined for a given bucket by binary splitting for some attribute value was set to (10-20), but the actual requirements for the value for those jobs that were placed in the bucket were, say (12, 14, 17), the range of the bucket may optionally be changed from (10-20) to (12-17).

The splitting technique of elements 913 and 916 may be repeated for each of the remaining attributes, until all the attribute value ranges have been split and the member jobs of the targeted number of buckets T has been identified. After all T buckets have been populated (as determined in element 910), a single aggregate required value may be determined for each attribute represented in each bucket (element 919). The aggregate required value may be set to the maximum, average, median, or some other statistical measure from the different values represented in the bucket, depending on the nature of the attribute and how the jobs are expected to behave if less than the actual amount indicated in the job is made available. For example, consider a trivial example in which the range of vCPUs needed for the jobs in a given bucket are (2,2,4,4): that is, there are four jobs in the bucket, needing 2, 2, 4 and 4 vCPUs respectively. Since each of the jobs requiring 4 vCPUs would (presumably) not work well if less than 4 vCPUs were provided for them, while the jobs requiring 2 vCPUs would presumably work well even if 4 vCPUs were supplied, the aggregate-required value for the bucket may be set to the maximum vCPU count from the range (i.e., 4 in this example). For other attributes, such as memory or deadlines, in some implementations the mean/median may be used as the aggregate-required value instead of the maximum of the range.

After the aggregate-required values are determined, the tuples of the space-efficient statistical representation may be generated (element 922). For each tuple, the aggregate-required value may be indicated for each dimension, and the job population of the tuple may be indicated. It is noted that variants of the above approach may be used in some embodiments—e.g., in one embodiment, the boundary values for the buckets may be predetermined rather than computed based on the actual job definitions.

Figure 10:
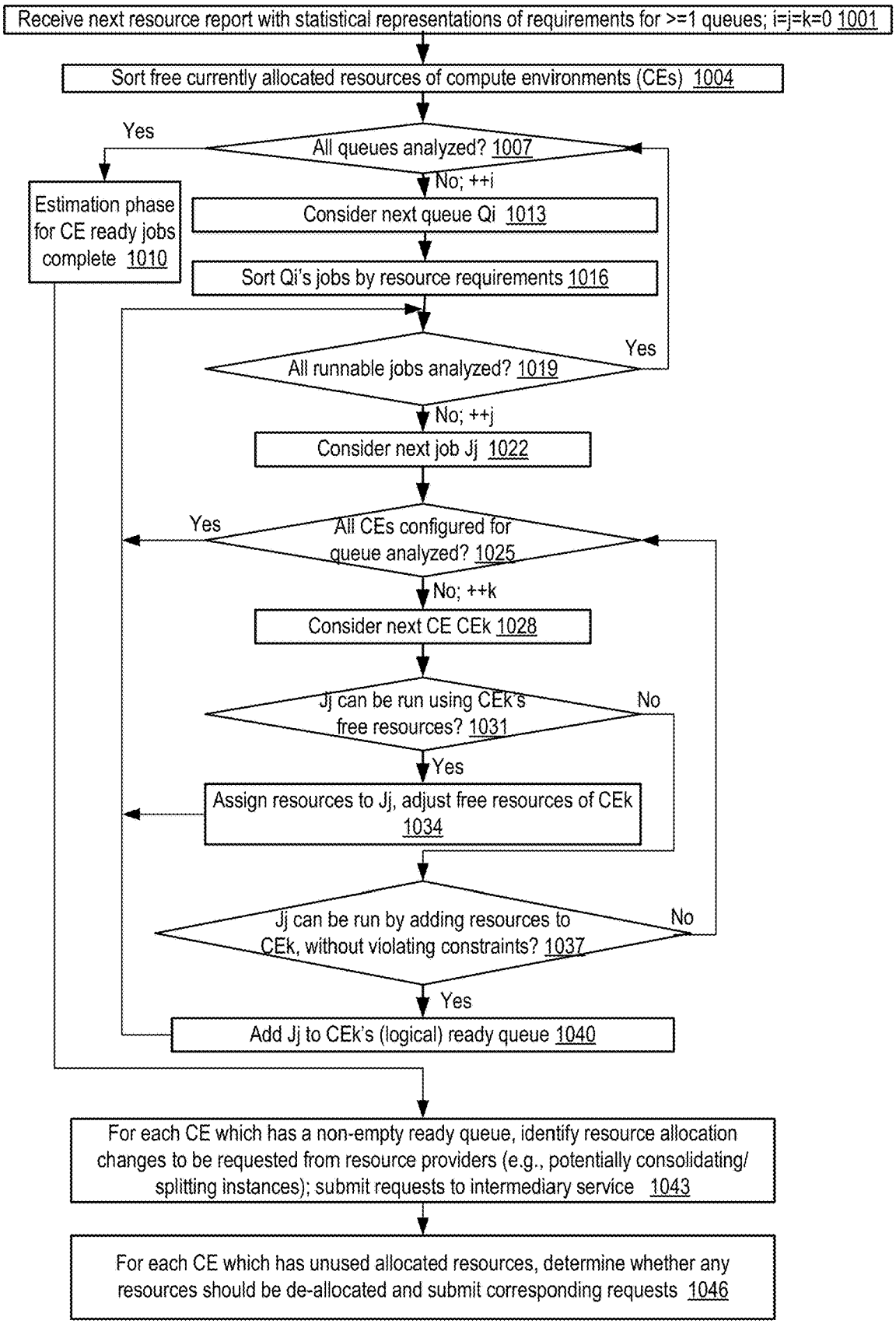
FIG. 10 is a flow diagram illustrating aspects of operations that may be performed at a resource controller in response to receiving a resource report, according to at least some embodiments.

FIG. 10 is a flow diagram illustrating aspects of operations that may be performed at a resource controller in response to receiving a resource report, according to at least some embodiments. In the depicted embodiment, the resource controller may attempt to first determine whether already-allocated resources which happen to be unused or free are sufficient to accommodate at least some jobs, and then, if some jobs remain unaccommodated, assign jobs to logical "ready" queues for respective compute environments if possible before actually issuing resource allocation change requests. As shown in element 1001, a resource report containing the statistical representations of job resource requirements for one or more queues may be obtained at the resource controller. Each of the queues may comprise one or more jobs, and be associated with one or more compute environments. Corresponding to each of the compute environments, zero or more resources may already have been allocated in the depicted embodiment; of the allocated resources, some may be in use (for one or more currently-running jobs) and others may currently be free. Variables i, j and k, used as index variables for queues, jobs and compute environments respectively, may be initialized to zero.

The free resources of each compute environment may be sorted, e.g., in an order from the largest free resource to the smallest free resource (element 1004). If there is at least one queue whose requirements have not yet been examined/analyzed (as detected in element 1007), the index variable I may be incremented and the next queue Qi may be examined (element 1013). Using the multi-dimensional representation of requirements, the jobs in Qi may be sorted based on their requirements. Any of several approaches may be used to perform a multi-dimensional sort in various embodiments—e.g., values for multiple attributes may be sorted in a selected order, or an aggregating function may be used to translate the multiple values into a single value which can then be used for sorting, and so on.

If all the runnable jobs of the queue Qi have been examined (as detected in element 1019), the next queue (if any remains unexamined) may be analyzed. Otherwise, the job index variable j may be incremented, and the next job Jj may be analyzed in the sorted order of jobs (element 1022).

If all the compute environments whose resources can be applied for Jj have been examined (as detected in element 1025), operations corresponding to element 1019 onwards may be repeated. If at least one compute environment remains unexamined with respect to Jj, the index variable k for compute environments may be incremented and the next compute environment (CEk) may be examined (element 1028).

The resources of CEk may be examined in two phases on behalf of j ob Jj in the depicted embodiment. First, the resource controller may check whether the free (currently-allocated but currently unused) resources of CEk are sufficient for Jj (element 1031). If so, those resources may be logically assigned to Jj, and the count of free resources of CEk may be reduced accordingly (element 1034), and the next job of Qi may be examined (if any jobs remain).

If Jj cannot be executed using the currently-free resources of CEk (as also determined in element 1031), the resource controller may determine whether sufficient additional resources could be allocated in CEk for Jj, without violating the resource limits set for CEk by the client on whose behalf CEk was created (element 1037). If so, Jj may be added to a logical ready queue simulated by the resource controller for CEk (element 1040). If allocating additional resources to allow Jj to be executed using CEk without violating constraints is not possible (as also detected in element 1037), the next compute environment configured for Qi may be examined (if any is available), and operations corresponding to elements 1025 onwards may be repeated until all the compute environments are exhausted. Under some circumstances, depending on the constraints set by the client and the requirements of Jj, it may not be possible to find enough resources for Jj without violating constraints, and the scheduling of Jj may have to wait (e.g., until one or more other jobs complete or are terminated).

After all the jobs in Qi have been analyzed, the next queue may be examined, using operations corresponding to elements 1007 onwards. After all the queues represented in the resource report have been analyzed with respect to the associated compute environments, the estimation phase of the analysis, in which jobs are either assigned free resources or placed in logical ready queues, may be considered complete (element 1010). At this point, those ready queues which are non-empty may be examined and the corresponding resource allocation changes to be requested from resource providers may be determined (element 1043). In some cases, the resource controller may be able to identify opportunities for resource consolidation (e.g., replacing two smaller instances of a resource with a single larger instance) or splitting (e.g., replacing one larger instance with multiple smaller instances), depending on the resource merging/splitting options available for the compute environments. The requests for the allocation changes may be submitted to intermediaries associated with the resource providers corresponding to various compute environments. In addition, in some embodiments, based on various factors such as billing metadata discussed in the context of FIG. 6, the resource controller may be able to identify resources that can be de-allocated (e.g., resources which have remained unused for beyond some threshold interval), and transmit the corresponding requests via the intermediaries to the resource providers (element 1046).

It is noted that in various embodiments, at least some operations other than those illustrated in the flow diagrams of FIG. 8, FIG. 9, and FIG. 10 may be used to implement the resource allocation techniques for batch jobs described above. Some of the operations shown may not be implemented in some embodiments or may be implemented in a different order, or in parallel rather than sequentially.

Use Cases

The techniques described above, of separating the responsibilities for resource allocation changes from the scheduling of the batch jobs for which the resources are to be used, may be useful in a variety of embodiments. Many data analysis tasks in various problem domains, including for example finance, security, medicine, and the like may be well suited to batch processing. A batch job management service which allows clients to define constraints on the resources to be used for their jobs, and then allows the clients to submit jobs as desired, leaving the task of managing those resources to the service, may simplify the workload for application designers in such problem domains. By generating small statistical representations of the job requirements for various job queues, regardless of the number of jobs pending in a given queue, the technique discussed above may enable efficient handling of a wide variety of client needs with respect to batch job processing.

Illustrative Computer System

Figure 11:
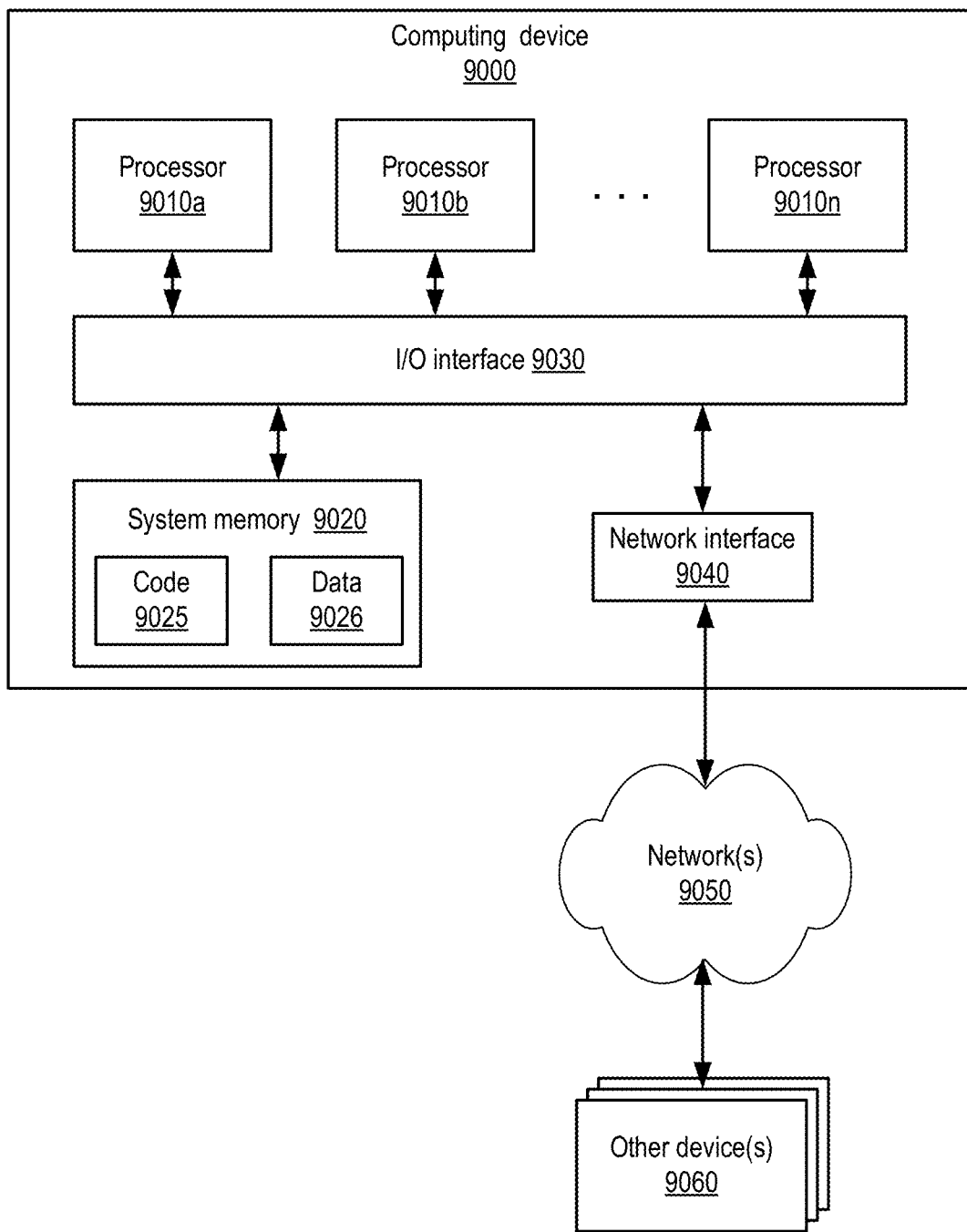
FIG. 11 is a block diagram illustrating an example computing device that may be used in at least some embodiments.

In at least some embodiments, a server that implements a portion or all of one or more of the technologies described herein, including the techniques to implement various data plane and control plane components of a batch job processing service and associated services, including schedulers, resource controllers and the like, may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAIVI), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
  performing, at one or more computing devices:
    determining (a) a limit on a data size of a report to be prepared on resource requirements of pending jobs of one or more job queues, and (b) a quantity of distinct resource attributes of the pending jobs which are to be indicated in the report, wherein individual ones of the distinct resource attributes correspond to respective resource types required by the pending jobs;
    computing, based at least in part on the determined limit and the determined quantity of resource attributes, a quantity of multidimensional buckets to be used to represent the resource requirements of the pending jobs in the report, wherein different ones of the resource attributes map to respective dimensions of the multidimensional buckets, wherein values for respective ones of the resource attributes are divided among the multidimensional buckets along the respective dimensions; and
    preparing the report comprising a representation of the resource requirements for the resource types required by the pending jobs, distributed among the quantity of multidimensional buckets such that the data size of the report does not exceed the determined limit.

2. The method as recited in claim 1, wherein the limit on the data size is independent of the number of pending jobs in the one or more queues, such that the data size of a first report which represents the resource requirement of a first number of pending jobs is no larger than the data size of a second report which represents the resource requirements of a second number of pending jobs, wherein the first number is greater than the second number.

3. The method as recited in claim 1, further comprising determining a respective aggregate requirement for one or more of the buckets, wherein the aggregate requirement corresponding to a particular bucket comprises one of: (a) an average of a set of resource requirements mapped to the particular bucket, (b) a maximum of a set of resource requirements mapped to the particular bucket or (c) a median of a set of resource requirements mapped to the particular bucket.

4. The method as recited in claim 1, wherein said preparing comprises utilizing a balanced splitting strategy to determine a range of requirements with respect to a particular resource for a particular bucket.

5. The method as recited in claim 1, further comprising determining a respective aggregate requirement for one or more of the buckets, wherein said determining the aggregate requirement comprises:
    selecting a type of aggregate requirement to be indicated in the report for a particular bucket based at least in part on an expected behavior of a job in response to providing a particular resource to the job in a quantity smaller than a maximum requirement of the job for the particular resource.

6. The method as recited in claim 1, further comprising performing, at the one or more computing devices:
    obtaining an event notification at a scheduler; and
    determining, based at least in part on the event notification, that the report is to be prepared.

7. The method as recited in claim 1, wherein at least one resource requirement indicated in the report is a requirement for a particular software stack.

8. A system, comprising:
    one or more computing devices;
    wherein the one or more computing devices include instructions that upon execution on or across one or more processors cause the one or more computing devices to:
        determine (a) a limit on a data size of a report to be prepared on resource requirements of pending jobs of one or more job queues, and (b) a quantity of distinct resource attributes of the pending jobs which are to be indicated in the report, wherein individual ones of the distinct resource attributes correspond to respective resource types required by the pending jobs;
        compute, based at least in part on the determined limit and the determined quantity of resource attributes, a quantity of multidimensional buckets to be used to represent the resource requirements of the pending jobs in the report, wherein different ones of the resource attributes map to respective dimensions of the multidimensional buckets, wherein values for respective ones of the resource attributes are divided among the multidimensional buckets along the respective dimensions; and
        prepare the report comprising a representation of the resource requirements for the resource types required by the pending jobs, distributed among the quantity of multidimensional buckets such that the data size of the report does not exceed the determined limit.

9. The system as recited in claim 8, wherein the limit on the data size is independent of the number of pending jobs in the one or more queues, such that the data size of a first report which represents the resource requirement of a first number of pending jobs is no larger than the data size of a second report which represents the resource requirements of a second number of pending jobs, wherein the first number is greater than the second number.

10. The system as recited in claim 8, wherein the one or more computing devices include instructions to determine a respective aggregate requirement for one or more of the buckets, wherein the aggregate requirement corresponding to a particular bucket comprises one of: (a) an average of a set of resource requirements mapped to the particular bucket, (b) a maximum of a set of resource requirements mapped to the particular bucket or (c) a median of a set of resource requirements mapped to the particular bucket.

11. The system as recited in claim 8, wherein to prepare the report, the one or more computing devices include further instructions that upon execution on or across the one or more processors further cause the one or more computing devices to:
    utilize a balanced splitting strategy to determine a range of requirements with respect to a particular resource for a particular bucket.

12. The system as recited in claim 8, wherein the one or more computing devices include instructions to determine a respective aggregate requirement for one or more of the buckets, wherein to determine the aggregate requirement, the one or more computing devices include further instructions that upon execution on or across the one or more processors further cause the one or more computing devices to:
    select a type of aggregate requirement to be indicated in the report for a particular bucket based at least in part on an expected behavior of a job in response to providing a particular resource to the job in a quantity smaller than a maximum requirement of the job for the particular resource.

13. The system as recited in claim 8, wherein the one or more computing devices include further instructions that upon execution on or across the one or more processors further cause the one or more computing devices to:
    obtain an event notification at a scheduler; and
    determine, based at least in part on the event notification, that the report is to be prepared.

14. The system as recited in claim 8, wherein at least one requirement indicated in the report is a requirement with respect to a time interval between a request for a job and an initiation of that job.

15. One or more non-transitory computer-accessible storage media storing program instructions that when executed on or across one or more processors cause one or more computer systems to:
    determine (a) a limit on a data size of a report to be prepared on resource requirements of pending jobs of one or more job queues, and (b) a quantity of distinct resource attributes of the pending jobs which are to be indicated in the report, wherein individual ones of the distinct resource attributes correspond to respective resource types required by the pending jobs;
    compute, based at least in part on the determined limit and the determined quantity of resource attributes, a quantity of multidimensional buckets to be used to represent the resource requirements of the pending jobs in the report, wherein different ones of the resource attributes map to respective dimensions of the multidimensional buckets, wherein values for respective ones of the resource attributes are divided among the multidimensional buckets along the respective dimensions; and prepare the report comprising a representation of the resource requirements for the resource types required by the pending jobs, distributed among the quantity of multidimensional buckets such that the data size of the report does not exceed the determined limit.

16. The one or more non-transitory computer-accessible storage media as recited in claim 15, storing further program instructions that when executed on or across the one or more processors cause one or more computer systems to:
  select an order in which the determined resource attributes of the pending jobs are to be assigned to the buckets; and
  in accordance with the selected order, perform a plurality of bucket splitting iterations to subdivide a plurality of buckets into respective groups of child buckets, wherein individual ones of the bucket splitting iterations correspond to respective ones of the determined resource attributes.

17. The one or more non-transitory computer-accessible storage media as recited in claim 15, further including instructions to determine a respective aggregate requirement for one or more of the buckets, wherein the aggregate requirement corresponding to a particular bucket comprises one of: (a) an average of a set of resource requirements mapped to the particular bucket, (b) a maximum of a set of resource requirements mapped to the particular bucket or (c) a median of a set of resource requirements mapped to the particular bucket.

18. The one or more non-transitory computer-accessible storage media as recited in claim 15, wherein to prepare the report, the one or more non-transitory computer-accessible storage media store further program instructions that when executed on or across the one or more processors further cause one or more computer systems to:
  utilize a balanced splitting strategy to determine a range of requirements with respect to a particular resource for a particular bucket.

19. The one or more non-transitory computer-accessible storage media as recited in claim 15, wherein to determine the aggregate requirement, the one or more computing devices include further instructions that upon execution on or across the one or more processors further cause the one or more computing devices to:
  select a type of aggregate requirement to be indicated in the report for a particular bucket based at least in part on an expected behavior of a job in response to providing a particular resource to the job in a quantity smaller than a maximum requirement of the job for the particular resource.

20. The one or more non-transitory computer-accessible storage media as recited in claim 15, wherein at least one resource requirement represented in the report is a requirement for a resource located within a provider network, and wherein at least one resource requirement represented in the report is a requirement for a resource located outside the provider network.

* * * * *